(12) United States Patent
Pertierra et al.

(10) Patent No.: US 12,225,329 B2
(45) Date of Patent: Feb. 11, 2025

(54) DUAL-MODULATION LASER PROJECTION SYSTEMS AND METHODS

(71) Applicant: Dolby Laboratories Licensing Corporation, San Francisco, CA (US)

(72) Inventors: Juan P. Pertierra, Fishers, IN (US); Martin J. Richards, Gig Harbor, WA (US); Dzhakhangir V. Khaydarov, Campbell, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 619 days.

(21) Appl. No.: 17/439,786

(22) PCT Filed: Mar. 15, 2020

(86) PCT No.: PCT/US2020/022867
§ 371 (c)(1),
(2) Date: Sep. 15, 2021

(87) PCT Pub. No.: WO2020/190823
PCT Pub. Date: Sep. 24, 2020

(65) Prior Publication Data
US 2022/0191440 A1      Jun. 16, 2022

Related U.S. Application Data

(60) Provisional application No. 62/818,934, filed on Mar. 15, 2019.

(30) Foreign Application Priority Data

Mar. 15, 2019   (EP) .................................... 19163175

(51) Int. Cl.
*H04N 9/31*       (2006.01)
*G02B 27/46*      (2006.01)

(52) U.S. Cl.
CPC ........... *H04N 9/3167* (2013.01); *G02B 27/46* (2013.01); *H04N 9/3126* (2013.01)

(58) Field of Classification Search
CPC ..... H04N 9/3167; H04N 9/3126; G02B 27/46
(Continued)

(56) References Cited

U.S. PATENT DOCUMENTS 5,053,628  A    10/1991  Yamamoto
7,988,297  B2    8/2011  Crill
(Continued)

FOREIGN PATENT DOCUMENTS

JP    2000347137 A    12/2000
JP    2007183456 A     7/2007
(Continued)

OTHER PUBLICATIONS

Shimadzu Corporation: Diffraction Efficiency & Relationship between Diffraction Efficiency and Polarization Sep. 11, 2017.

*Primary Examiner* — William Choi

(57) ABSTRACT

A dual-modulation laser projection system (100) includes a polarizing beamsplitter (110) for splitting laser light (180) into first (182) and second (184) polarized beams having mutually orthogonal polarizations, a phase spatial light modulator (120) for beam steering the second polarized beam (184), a mechanical amplitude spatial light modulator (130) for amplitude modulating a combination of the first polarized beam (182) and the second polarized beam (186) as beam steered by the phase spatial light modulator (120), and a filter (140) for removing, from the combination (190) of the first and second polarized beams, one or more of a plurality of diffraction orders introduced by the mechanical amplitude spatial light modulator (130), to generate filtered, modulated output light (192).

18 Claims, 14 Drawing Sheets

(58) Field of Classification Search
USPC .................................. 359/237, 238, 292, 301
See application file for complete search history.

(56) References Cited

U.S. PATENT DOCUMENTS

| | | |
|---|---|---|
| 8,305,700 B2 | 11/2012 | Riley |
| 9,022,582 B2 | 5/2015 | Kang |
| 9,146,450 B2 | 9/2015 | Otani |
| 9,983,545 B2 | 5/2018 | Gorny |
| 2003/0231373 A1 | 12/2003 | Kowarz |
| 2006/0082735 A1 | 4/2006 | Yang |
| 2008/0198432 A1 | 8/2008 | Tanaka |
| 2016/0004219 A1 | 1/2016 | Leister |
| 2016/0381329 A1 | 12/2016 | Damberg |
| 2017/0099466 A1 | 4/2017 | Damberg |
| 2018/0231771 A1 | 8/2018 | Schuck, III |
| 2020/0288093 A1 | 9/2020 | Pertierra |
| 2021/0141238 A1 | 5/2021 | Pertierra |

FOREIGN PATENT DOCUMENTS

| | | |
|---|---|---|
| JP | 2010520515 A | 6/2010 |
| JP | 2018532152 A | 11/2018 |
| WO | 2016103869 A1 | 6/2016 |
| WO | 2018064374 A1 | 4/2018 |

DUAL-MODULATION LASER PROJECTION SYSTEMS AND METHODS

CROSS-REFERENCE TO RELATED APPLICATIONS

This patent application claims the benefit of priority from U.S. Provisional Patent Application No. 62/818,934, filed on 15 Mar. 2019 and European Patent Application No. 19163175.3, filed on 15 Mar. 2019, each one incorporated by reference in its entirety.

TECHNICAL FIELD

The present application relates to laser projectors and digital cinema.

BACKGROUND

Most movies are now distributed in digital format, and movie theaters use digital projectors to project digital imagery onto the movie screen. Digital projectors are even used by some consumers in home theaters as a superior alternative to a television display. The digital projectors employ a bright light source (or several bright light sources), a digital spatial light modulator (SLM), and a projection lens. The SLM spatially modulates the light emitted by the light source such that the modulated light, when projected onto the screen by the projection lens, forms the desired images. The SLM may be a liquid crystal array or a micromirror array.

In the most straightforward digital projectors, each pixel of the SLM adjusts the amplitude of the light propagating from that pixel toward the projector. In such digital projectors, a large portion of the light generated by the light source is lost at the SLM. Some digital projectors use powerful light source to produce bright images despite this loss of light. Lasers are considered a particularly attractive solution, at least in part because laser light generally can be collected from the source and propagated through the optical system of a digital projector more efficiently than, e.g., light from incandescent light sources or light-emitting diodes, thus producing higher brightness.

SUMMARY

In an embodiment, a dual-modulation laser projection system includes a polarizing beamsplitter, a phase spatial light modulator (SLM), a mechanical amplitude SLM, and a filter. The polarizing beamsplitter is configured to splitting laser light into first and second polarized beams having mutually orthogonal polarizations. The phase SLM is configured to beam steer the second polarized beam. The mechanical amplitude SLM is configured to amplitude modulate a combination of (i) the first polarized beam and (ii) the second polarized beam as beam steered by the phase SLM. The filter is configured to remove, from an amplitude combination of the first and second polarized beams, one or more of a plurality of diffraction orders introduced by the mechanical amplitude SLM, to generate filtered, modulated output light.

In an embodiment, a dual-modulation laser projection method includes (a) splitting laser light into first and second polarized beams having mutually orthogonal polarizations, (b) phase modulating the second polarized beam in a spatially non-uniform manner to beam steer the second polarized beam, and (c) after the step of modulating the second polarized beam combining the first and second polarized beams into combined light, mechanically amplitude modulating the combined light in a spatially non-uniform manner, and removing, from the combined light, one or more of a plurality of diffraction orders introduced in the step of mechanically amplitude modulating the combined light, so as to generate filtered modulated output light.

DESCRIPTION OF EXAMPLE EMBODIMENTS

Figure 1:
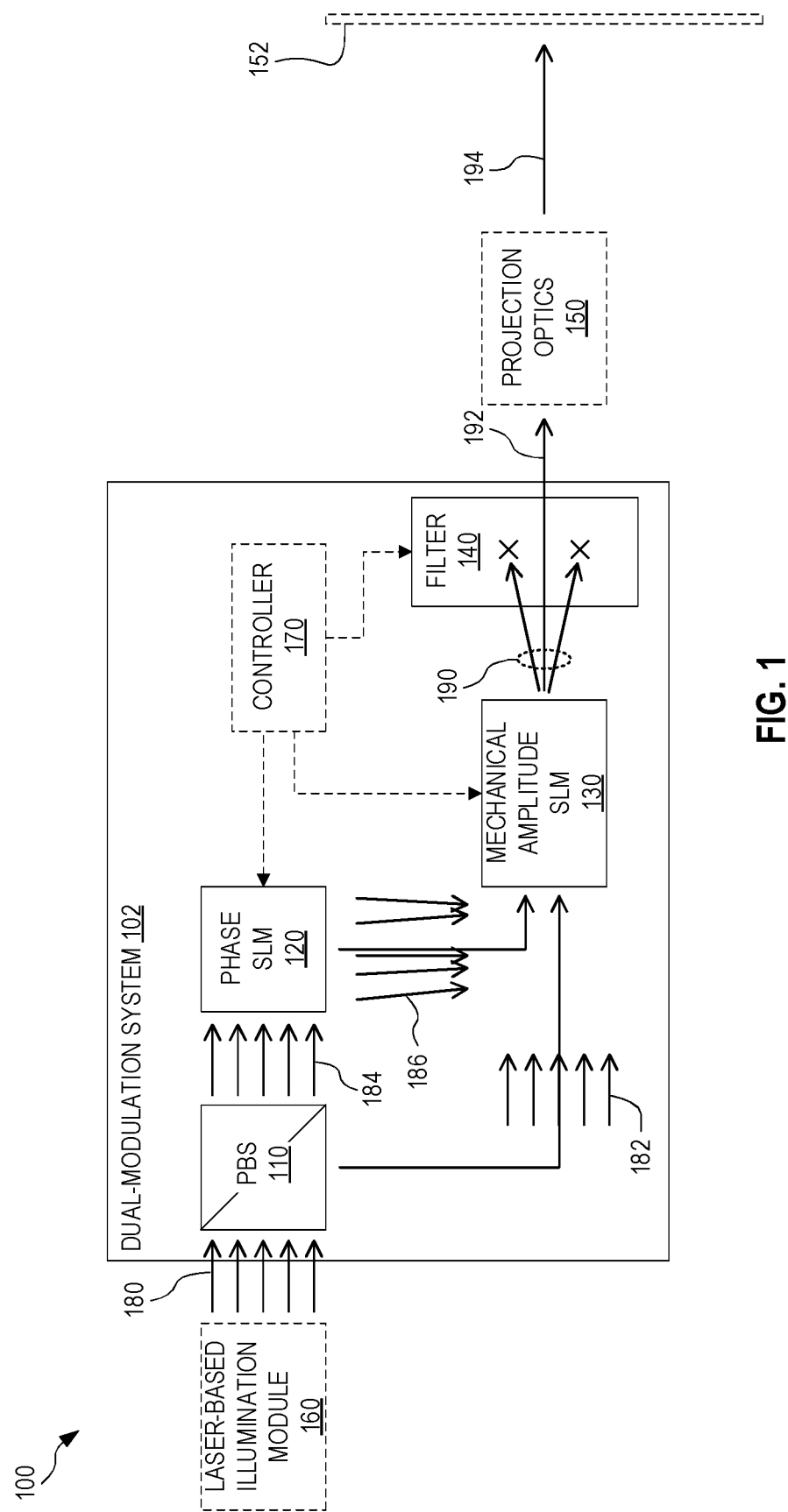
FIG. 1 illustrates a dual-modulation system for modulating laser light to generate a light field that may be projected onto a screen to form an image on screen, according to an embodiment.

FIG. 1 illustrates one dual-modulation system 102 for modulating laser light 180 to generate a light field 192 that may be projected onto a screen 152 to form an image on screen 152. FIG. 1 depicts dual-modulation system 102 in one example use scenario. In this scenario, dual-modulation system 102 is implemented in a dual-modulation digital laser projector 100 that, in addition to dual-modulation system 102, includes projection optics 150 for projecting light field 192 onto screen 152 as screen illumination 194. Screen illumination 194 produces an image on screen 152. Laser projector 100 may further include a laser-based illumination module 160 for generating laser light 180.

Laser light 180 may be substantially monochromatic. A polychromatic laser projector may include a plurality of laser projectors 100 to produce a respective plurality of monochromatic light fields 192, each of which has a different color (e.g., red, green, and blue). In this polychromatic laser projector, the plurality of laser projectors 100 may share a common projection optics 150.

Dual-modulation system 102 enables improved contrast and brightness of imagery projected onto screen 152 by projection optics 150 in laser projector 100, as compared to a conventional single-stage modulation system. The maximum contrast ratio achievable by even high-performance laser projectors employing a single-stage modulation system is generally no greater than about 2000:1, which is several orders of magnitude less than the range of luminances detectable by the human visual system. Thus, such a laser projector is not capable of producing imagery that contain both areas of high brightness and regions that are truly black, as perceived by a human viewer. Laser projector 100 employing dual-modulation system 102 may produce a contrast ratio of 200,000:1 or more.

Dual-modulation system 102 has two stages of modulation. However, dual-modulation system 102 subjects only one polarization component of laser light 180 to both the first and the second stage of modulation, whereas the orthogonal polarization component bypasses the first stage of modulation. The second stage of modulation is common to both polarization components. Dual-modulation system 102 includes a polarizing beamsplitter (PBS) 110, a digital phase spatial light modulator (SLM) 120, a digital mechanical amplitude SLM 130, and a filter 140. PBS 110 splits laser light 180 into two polarized beams 182 and 184 having mutually orthogonal polarizations. Phase SLM 120 modulates phases of polarized beam 184 to beam steer a resulting polarized beam 186 before mechanical amplitude SLM 130 modulates amplitudes of the combination of polarized beams 182 and 186 to generate combined modulated light 190. Mechanical amplitude SLM 130 causes diffraction of polarized beams 182 and 186, such that combined modulated light 190 includes a plurality of diffraction orders. Filter 140 removes, from combined modulated light 190, one or more of these diffraction orders, so as to generate filtered, modulated output light forming light field 192.

Dual-modulation system 102 may include a controller 170 that controls the operation of phase SLM 120 and mechanical amplitude SLM 130 to produce a desired light field 192. In embodiments of dual-modulation system 102 where filter 140 is adjustable, controller 170 may further control the operation of filter 140. Controller 170 may include a processor and machine-readable instructions encoded in non-transitory memory. Upon execution of the machine-readable instructions by the processor, controller 170 controls phase SLM 120 and mechanical amplitude SLM 130 (and optionally filter 140) to produce a desired light field 192 specified by an external input to controller 170.

Each pixel of mechanical amplitude SLM 130 is mechanically actuated to modulate the amplitude of the light incident upon the pixel. As implemented in dual-modulation system 102, each pixel of mechanical amplitude SLM 130 modulates a corresponding spatial portion of the combination of polarized beams 182 and 186, to transfer a desired fraction thereof to combined modulated light 190. When this fraction is less than 1, the remaining fraction is lost (e.g., directed to a beam dump). Thus, the amplitude modulation performed by mechanical amplitude SLM 130 leads to loss of light in dual-modulation system 102. In contrast, the phase modulation performed by the pixels of phase SLM 120 spatially redistributes (i.e., beam steers) light within polarized beam 186, as compared to the spatial distribution of light within polarized beam 184. This process does not inherently lead to loss of light, although non-idealities in phase SLM 120 (such as gaps between the pixels) may lead to a small light loss.

In operation, dual-modulation system 102 may utilize the beam steering capability of phase SLM 120 to optimize the spatial distribution of polarized beam 186 incident on mechanical amplitude SLM 130. For example, phase SLM 120 may at any given time (a) steer less light onto pixels of mechanical amplitude SLM 130 configured to transfer only a small fraction (or none) of the incident light to combined modulated light 190 and (b) steer more light onto pixels of mechanical amplitude SLM 130 configured to transfer a large fraction (or all) of the incident light to combined modulated light 190. Thus, phase SLM 120 may be operated to reduce the light loss caused by amplitude modulation by mechanical amplitude SLM 130. By virtue of this reduction of light loss, dual-modulation system 102 enables, for a given power of laser light 180, higher brightness of imagery projected onto screen 152 by projection optics 150 of laser projector 100. In addition, since phase SLM 120 helps steer light away from pixels of mechanical amplitude SLM 130 where less light is desired, dual-modulation system 102 enables improved light extinction in regions of images, projected onto screen 152 by projection optics 150 of laser projector 100, that are intended to be dark. Thus, dual-modulation system 102 also enables improved contrast of imagery projected onto screen 152 by projection optics 150 of laser projector 100.

It is understood that the contribution of polarized beam 186 to light field 192 is a function not only of the amplitude distribution of polarized beam 186 on mechanical amplitude SLM 130 but also of the propagation direction distribution of polarized beam 186 incident on mechanical amplitude SLM 130.

Phase SLM 120 is polarization sensitive. The phase shift imposed by a pixel of phase SLM 120 to light incident thereon depends on the polarization of the light. Therefore, it is difficult to optimize phase modulation by phase SLM 120 for unpolarized or partly polarized light. Dual-modulation system 102 solves this problem by directing only one polarization component (polarized beam 184) to phase SLM 120, thereby maximizing the beam-steering control provided by phase SLM 120.

Herein, "unpolarized" light refers to light that, when decomposed into two orthogonal polarization components, contains approximately 50 percent of each polarization component, regardless of the orientation of the two orthogonal polarization components; "polarized" light refers to light that is all of the same polarization; and "partly polarized" light refers to light that contains a combination of unpolarized light and polarized light.

When laser light 180 is unpolarized, only half of laser light 180 is subjected to dual-stage modulation. Nevertheless, the degree of control provided by phase SLM 120, by virtue of the light incident thereon being polarized, may allow dual-modulation system 102 to produce a higher contrast ratio than if all of such unpolarized laser light 180 was directed to phase SLM 120. In an embodiment, laser-based illumination module 160 includes a fiber laser for producing laser light 180. In this embodiment, laser light 180 may be unpolarized or partly unpolarized.

Phase SLM 120 may be a liquid crystal SLM. In one such embodiment, phase SLM 120 includes a reflective liquid-crystal-on-silicon (LCOS) modulator. In another such embodiment, phase SLM 120 includes a transmissive liquid crystal (LC) panel similar to that found in a liquid crystal display (LCD). In each of these two embodiments, each pixel of the liquid crystal SLM has an adjustable refractive index, and the liquid crystal SLM steers polarized beam 186 by spatially modulating the refractive indices of the pixels of the liquid crystal SLM so as to spatially modulate the phase of light outputted by the pixels.

Mechanical amplitude SLM 130 may include a mirror array. In one such embodiment, mechanical amplitude SLM 130 is a digital micromirror device (DMD), for example a micro-opto-electromechanical system (MOEMS) SLM.

Diffraction by mechanical amplitude SLM 130 may, in the absence of filter 140, reduce the projector contrast ratio (PCR) of laser projector 100. PCR of a projector is defined herein as the ratio of ON to OFF luminous intensities (or, equivalently, first and second photometric luminances) measured at a projection screen illuminated by the projector (such as screen 152). ON and OFF luminous intensities are generated when the projector is controlled to output its brightest output (e.g., white) and its darkest output (e.g., black), respectively. The ON and OFF luminous intensities of laser projector 100 are defined as the luminous intensities directed toward screen 152 when all pixels of mechanical amplitude SLM 130 are set in respective ON and OFF positions. The PCR of dual-modulation system 102 is similarly defined as the ratio of ON to OFF luminous intensities outputted by dual-modulation system 102 and, when dual-modulation system 102 is implemented in laser projector 100, directed toward projection optics 150. By forwarding only a subset of the diffraction orders to projection optics 150, filter 140 may be configured to improve PCR of dual-modulation system 102 and laser projector 100 as compared to similar systems that do not include filter 140.

In one embodiment, filter 140 is configured to output light field 192 as collimated light. In another embodiment, light field 192 is non-collimated, for example diverging, at the output of filter 140. In this embodiment, dual-modulation system 102 may further include a collimation lens (not shown in FIG. 1). Alternatively, dual-modulation system 102 may output light field 192 as non-collimated light. Laser light 180 may be substantially collimated at the input to dual-modulation system 102. Laser light 180 may be characterized by a numerical aperture of less than 0.2 at the input to dual-modulation system 102.

Figure 2:
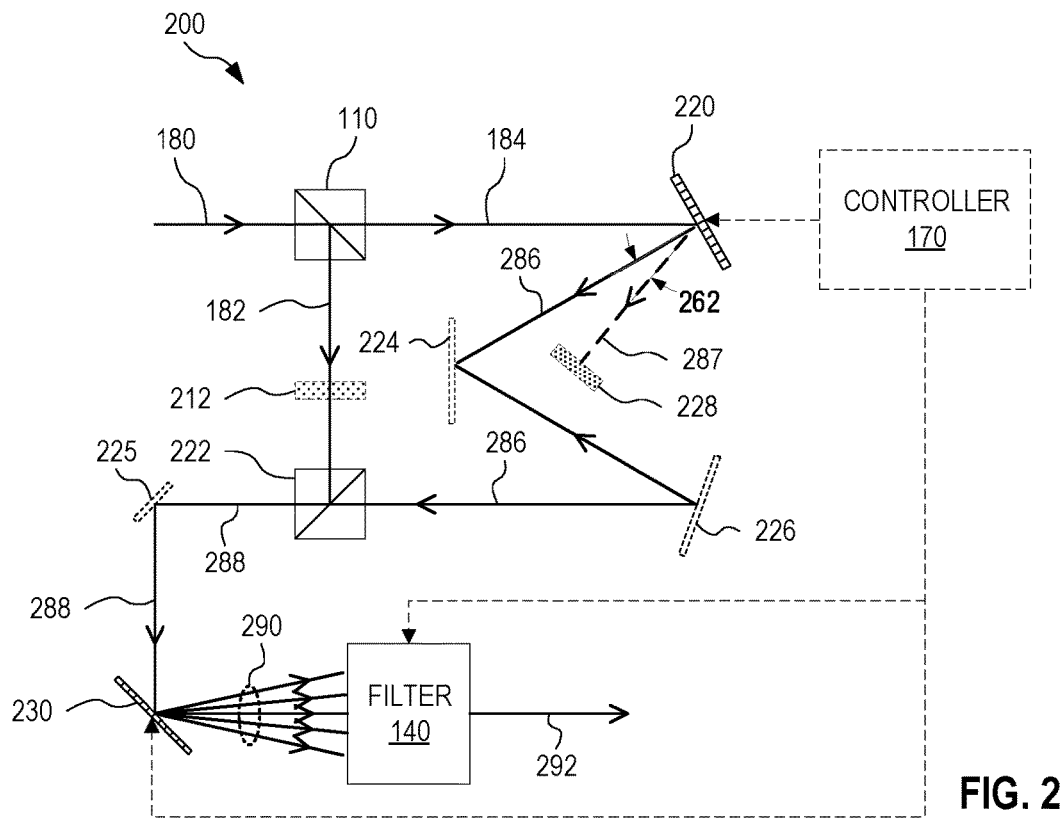
FIG. 2 illustrates a dual-modulation system with two reflective spatial light modulators (SLMs) and a polarizing beam combiner that combines two polarization paths after beam steering of one of the two polarization paths by the first one of the reflective SLMs and before spatial amplitude modulation of the combined light by the second one of the two reflective SLMs, according to an embodiment.

FIG. 2 illustrates one dual-modulation system 200 with two reflective SLMs and a polarizing beam combiner that combines two polarization paths after beam steering of one of the two polarization paths by the first one of the reflective SLMs and before spatial amplitude modulation of the combined light by the second one of the two reflective SLMs. Dual-modulation system 200 is an embodiment of dual-modulation system 102 that (a) implements phase SLM 120 as an LCOS SLM 220, (b) implements mechanical amplitude SLM 130 as DMD 230, and (c) includes a polarizing beam combiner 222.

LCOS SLM 220 modulates phases of polarized beam 184 to beam steer a resulting polarized beam 286. Polarizing beam combiner 222 combines polarized beam 286 with polarized beam 182 to form a combined beam 288. DMD 230 modulates amplitudes of the combination of polarized beams 182 and 286 to generate combined modulated light 290. DMD 230 causes diffraction of combined beam 288, such that combined modulated light 290 includes a plurality of diffraction orders. Filter 140 removes, from combined modulated light 290, one or more of these diffraction orders, so as to generate filtered, modulated output light forming a light field 292, as discussed above in reference to FIG. 1.

In certain embodiments, the light outputted by LCOS SLM 220 is distributed over a plurality of diffraction orders such that at least one diffraction order, in addition to a dominant diffraction order associated with polarized beam 286, contains a non-negligible amount of light. Such diffraction is, for example, caused by small gaps between pixels of LCOS SLM 220 and/or reflections from different interfaces of LCOS SLM 220. In one embodiment, the dominant diffraction order is separated from each other non-negligible diffraction order by an angle sufficient that the other non-negligible diffraction orders may be blocked by a beam dump. In the example depicted in FIG. 2, LCOS SLM 220 produces a dominant diffraction order that is directed to polarizing beam combiner 222 as polarized beam 286 The dominant diffraction order used as polarized beam 286 may be the zeroth diffraction order of LCOS SLM 220. In one example, at least 90% of the light outputted by LCOS SLM 220 is in the dominant diffraction order. In one embodiment, the fill factor of LCOS SLM 220 is at least 90%, such as approximately 95%, so as to ensure that at least 90% of the light outputted by LCOS SLM 220 is in the dominant diffraction order.

In one scenario, LCOS SLM 220 steers polarized beam 286 at an angle 262 to zeroth order specular reflection off of LCOS SLM 220. In this scenario, dual-modulation system 200 may include a beam dump 228 that blocks specularly reflected light from LCOS SLM 220, such as a fraction of polarized beam 184 reflected by a coverglass, and/or other interfaces, of LCOS SLM 220. Angle 262 may be in the range from one to five degrees. In another scenario, not depicted in FIG. 2, LCOS SLM 220 is modulated to suppress steering of polarized beam 286 in the same direction as the specular reflection direction of polarized beam 184 off of LCOS SLM 220, but allow steering of polarized beam 286 in multiple other directions or direction ranges away from the specular reflection direction. In this scenario, dual-modulation system 200 may include relay optics between LCOS SLM 220 and DMD 230, wherein the relay optics has a Fourier plane at a spatial filter that blocks light specularly reflected off of LCOS SLM 220.

Each mirror of DMD 230 is adjustable between two different orientations: an ON orientation and an OFF orientation. DMD 230 spatially modulates the amplitude of combined beam 288 by suitably orienting its mirrors. The distribution of power across different diffraction orders of DMD 230 depends on the orientation of the mirrors of DMD 230.

In one implementation of dual-modulation system 200, LCOS SLM 220 has a 1920×1200 array of square pixels configured with an 8 micron pitch between pixels in each dimension, and DMD 230 has a 4096×160 array of square mirrors configured with a 7-8 micron pitch between mirrors in each dimension. In a modification of this implementation, the resolution of the pixel array of LCOS SLM 220 is increased to have at least 3500 pixels in the long dimension, a pitch between pixels of less than 7 microns, and an aspect ratio that is similar but not necessarily identical to the aspect ratio of the mirror array of DMD 230. The aspect ratios of LCOS SLM 220 and DMD 230 may be within 20% of each other. In another implementation, LCOS SLM 220 has a 1920×1200 array of square pixels configured with an 8 micron pitch between pixels in each dimension, and DMD 230 has a 2048×1080 array of square mirrors configured with a 10-14 micron pitch between mirrors in each dimension. Embodiments of dual-modulation system 200 characterized by the pixel resolution of DMD 230 exceeding the pixel resolution of LCOS SLM 220 may help reduce of prevent appearance of halos in images formed from light field 292. Such halos may appear if spatial features introduced by the beam steering by LCOS SLM 220 are smaller than the mirrors of DMD 230.

Dual-modulation system 200 may include a dimming optic 212 in the path of polarized beam 182 between PBS 110 and polarizing beam combiner 222. In one embodiment, dimming optic 212 is a variable neutral density filter. In another embodiment, dimming optic 212 is a variable polarization rotator that cooperates with polarizing beam combiner 222 to define the fraction of polarized beam 182 that is coupled into combined beam 288. This variable polarization rotator may be a Faraday rotator, or half-wave plate with adjustable orientation. Without departing from the scope hereof, dimming optic 212 may be in the path of polarized beam 286 instead of in the path of polarized beam 182, or one dimming optic 212 may be in the path of polarized beam 182 while another dimming optic 212 is in the path of polarized beam 286.

Dual-modulation system 200 may include one or more mirrors and/or other beam-steering element(s) to direct polarized beams 182 and 286 to polarizing beam combiner 222. In the example depicted in FIG. 2, dual-modulation system 200 includes folding mirrors 224 and 226 in the path of polarized beam 286, as well as folding mirror 225 in the path of combined beam 288. Although not depicted in FIG. 2, dual-modulation system 200 may include lenses and/or other refractive elements to change the size of any one of polarized beam 182, polarized beam 286, and combined beam 288. Without departing from the scope hereof, dual-modulation system 200 may be configured with polarization rotation (e.g., half-wave plates) in each of (a) the path associated with polarized beam 182 and (b) the path associated with polarized beams 184 and 286, such that one of PBS 110 and polarizing beam combiner 222 reflects polarized beam 182 and the other one of PBS 110 and polarizing beam combiner 222 transmits polarized beam 182.

Figure 3:
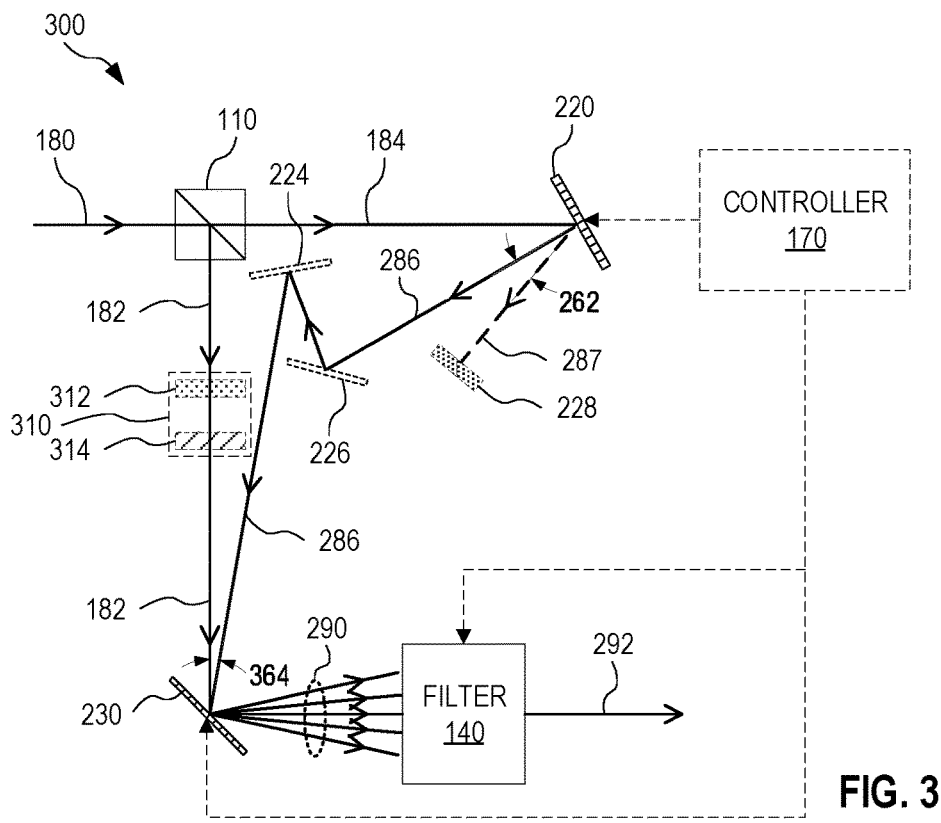
FIG. 3 illustrates another dual-modulation system with two reflective SLMs, wherein two different polarization paths are combined directly on a second one of the reflective SLMs after beam steering of one of the polarization paths by a first one of the reflective SLMs, according to an embodiment.

FIG. 3 illustrates another dual-modulation system 300 with two reflective SLMs wherein two different polarization paths are combined directly on a second one of the reflective SLMs after beam steering of one of the polarization paths to a first one of the reflective SLMs. Dual-modulation system 300 is an embodiment of dual-modulation system 102 that (a) implements phase SLM 120 as an LCOS SLM 220 and (b) implements mechanical amplitude SLM 130 as DMD 230. Dual-modulation system 300 is similar to dual-modulation system 200 except that dual-modulation system 300 combines polarized beams 182 and 286 directly on DMD 230. The angles of incidence of polarized beams 182 and 286 onto DMD 230 may differ from each other by an angle 364 that is less than ten degrees.

As a replacement for optional dimming optic 212, dual-modulation system 300 may include a dimming unit 310. Although depicted in the path of polarized beam 182, optional dimming unit 310 may be in the path of polarized beam 286, or dual-modulation system 300 may include two dimming units 310 positioned in the paths of polarized beams 182 and 286, respectively Dimming unit 310 may be a variable neutral density filter. Alternatively dimming unit 310 includes a variable polarization rotator 312 and a polarizer 314 that cooperate to adjust the fraction of polarized beam 182 delivered to DMD 230. Variable polarization rotator 312 is, for example, a half-wave plate with adjustable orientation or a Faraday rotator.

In an embodiment, dual-modulation system 300 is configured with ninety-degree polarization in one of the two polarization paths, such that polarized beams 182 and 286 have the same polarization when incident upon DMD 230. This embodiment removes polarization-induced differences in the diffraction imposed by DMD 230 on polarized beams 182 and 286. For example, polarizer 314 may be configured such that the polarization direction of polarized beam 182, after polarizer 314, is rotated by ninety degrees compared to the polarization direction of polarized beam 182 at the output of PBS 110. In another example, a half-wave plate is inserted in either (a) the path of polarized beam 182 or (b) the path of one of polarized beams 184 and 286.

Without departing from the scope hereof, DMD 230 may be implemented in other embodiments of dual-modulation system 102 than those depicted in FIGS. 2 and 3.

Figure 4:
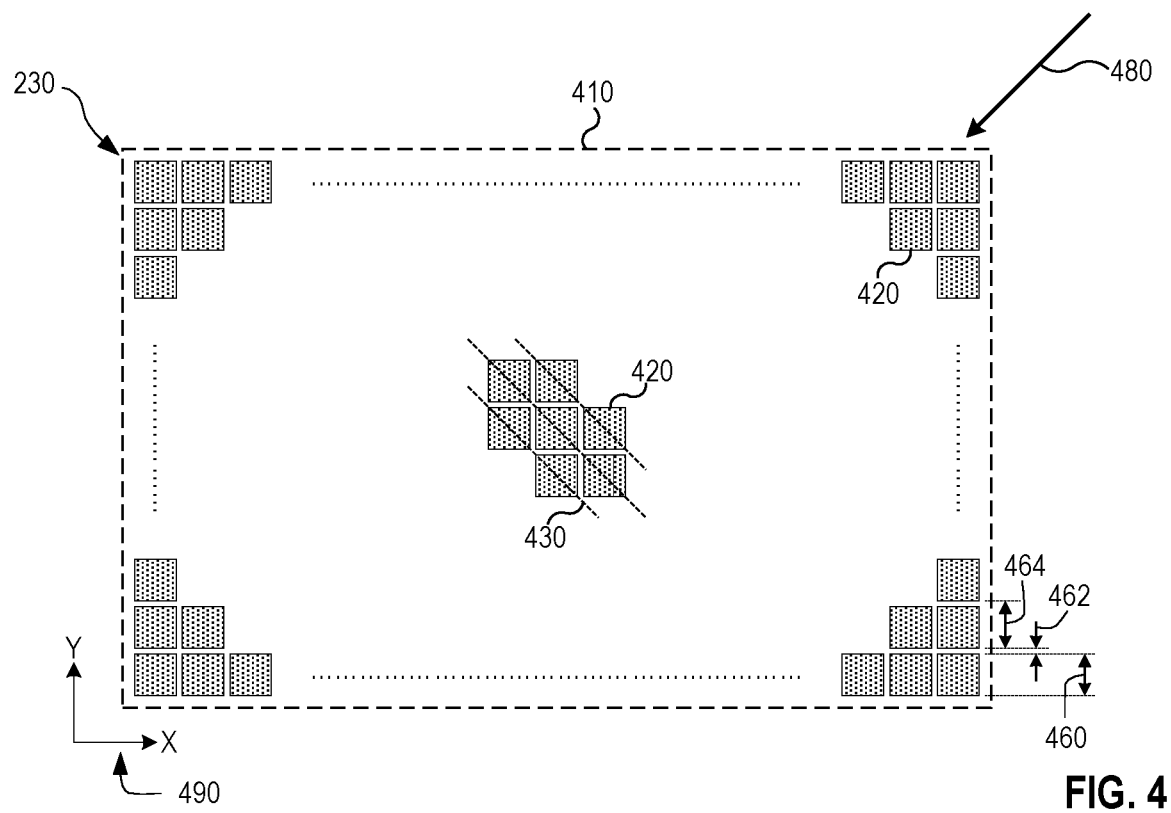
FIGS. 4 and 5 are front and cross-sectional side views, respectively, of a digital micromirror device (DMD), according to an embodiment.
Figure 5:
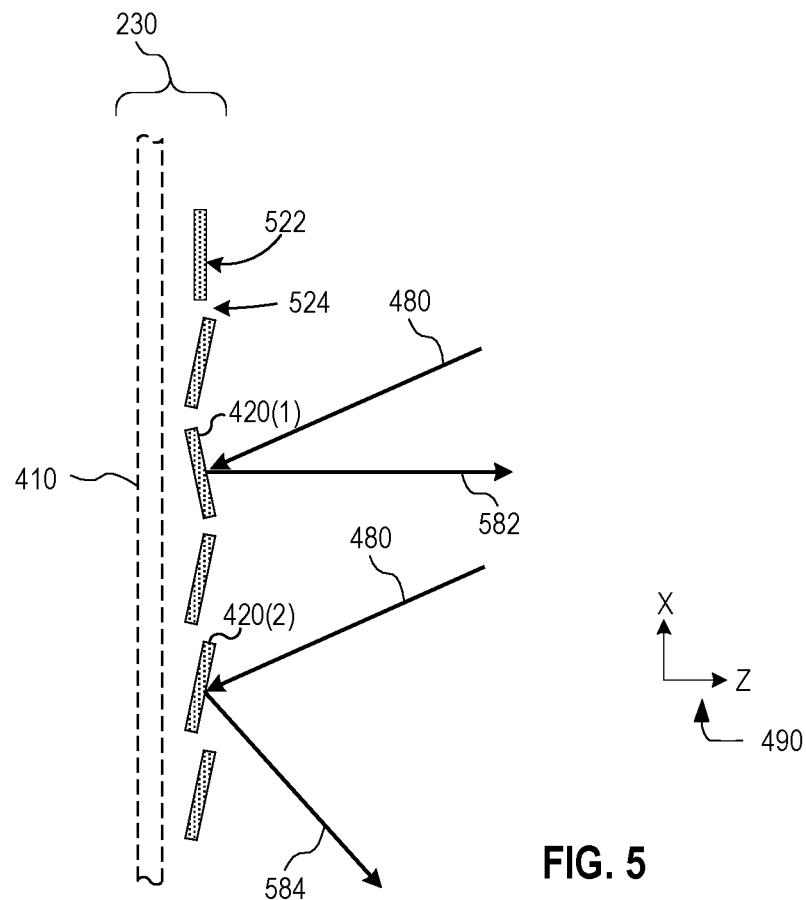

FIGS. 4 and 5 are front and cross-sectional side views, respectively, of DMD 230. FIGS. 4 and 5 are best viewed together in the following description. DMD 230 includes a plurality of micromirrors 420 arranged in a two-dimensional rectangular array. Micromirrors 420 may be square, as depicted in FIG. 4. For clarity, FIG. 4 only shows representative micromirrors 420 at the corners and center of DMD 230, and not all micromirrors 420 are labeled in FIG. 5. The orientation of each micromirror 420 is adjustable, for example by electrostatic actuation, to steer input light 480. Input light 480 is an example of any one of (a) a combination of polarized beams 182 and 186 shown in FIG. 1, (b) combined beam 288 shown in FIG. 2, and (c) a combination of polarized beams 182 and 286 shown in FIG. 3.

In one implementation, each micromirror 420 may be tilted about a rotation axis 430. Rotation axis 430 may be oriented at −45 degrees to the x-axis, as depicted in FIG. 4. Without departing from the scope hereof, the orientation and location of rotation axis 430 may be different from that shown in FIG. 4. DMD 230 may be a digital light processor (DLP) from Texas Instruments.

Micromirrors 420 may be mounted on a substrate 410 lying in the x-y plane (see right-handed coordinate system 490). For clarity, mechanical structures physically coupling micromirrors 420 to substrate 410 are not depicted in FIGS. 4 and 5.

FIG. 5 shows micromirrors 420 tilted to steer input light 480. Micromirror 420(1) is actuated in an ON position to specularly reflect input light 480 into ON-reflected light 582 parallel to the z-axis (see coordinate system 490). Micromirror 420(2) is actuated in an OFF position to specularly reflect input light 480 into OFF-reflected light 584. In one use scenario, applicable to any one of dual-modulation systems 102, 200, and 300, controller 170 amplitude-modulates the light incident on DMD 230 by, for each micromirror 420, setting the orientation of that particular micromirror 420 to a desired one of the ON position and the OFF position. Micromirror 420(3) is unactuated, lying in the x-y plane (e.g., parallel to substrate 410) in a flat-state. Alternatively, DMD 230 may be configured such that micromirrors 420, when unactuated, are at an angle to the x-y plane. For example, a chosen one of the ON and OFF positions may correspond to micromirrors 420 being unactuated.

A front face 522 of each micromirror 420 may be coated with a layer of deposited metal (e.g., aluminum) that acts as a reflective surface for reflecting input light 480. Gap 524 between micromirrors 420 may be absorptive. For example, input light 480 that enters gap 524 may be absorbed by substrate 410. Without departing from the scope hereof, DMD 230 may be implemented to direct ON-reflected light 582 and OFF-reflected light 584 in respective directions different from those shown in FIG. 5.

Micromirrors 420 and gaps 524 therebetween cooperate to form a two-dimensional grating that diffracts input light 480. Therefore, modulated light propagating away from DMD 230 may form a plurality of diffraction orders observable as a Fraunhofer diffraction pattern (see diffraction patterns 900 and 1000 of FIGS. 9 and 10, respectively) in a far-field region of DMD 230 or at a focal plane of a lens mounted after DMD 230. Each diffraction order corresponds to one light beam propagating away from DMD 230 in a unique respective direction. By design, most of the optical power of modulated light from DMD 230 may be in the zeroth diffraction order, corresponding to specularly reflected ON- and OFF-reflected lights 582 and 584.

Diffraction of input light 480 by DMD 230 may reduce the PCR of a laser projector using DMD 230 (e.g., laser projector 100 without filter 140). How DMD 230 diffracts input light 480 may be determined by a variety of parameters, such as (1) the wavelength of input light 480, (2) the direction of input light 480, (3) the pitch 464 of DMD 230, (4) a width 462 of gaps 524, and (5) the ON and OFF tilt angles of micromirrors 420. In both the x and y dimensions, pitch 464 equals a sum of width 462 and a micromirror edge length 460, as shown in FIG. 4 for the y dimension. Pitch 464 may be between 5 and 15 microns. Width 462 may be less than 1 micron. In one example, pitch 464 is between 7 and 8 microns and width 462 is between 0.7 and 0.9 microns.

Without departing from the scope hereof, DMD 230 may be arrange micromirrors 420 in an irregular array, one or more micromirrors 420 may have size and/or shape different from that of other micromirrors 420, and/or width 462 may depend on the location without DMD 230. Other embodiments of mechanical amplitude SLM 130 may exhibit diffraction behavior similar to that of DMD 230.

Figure 6:
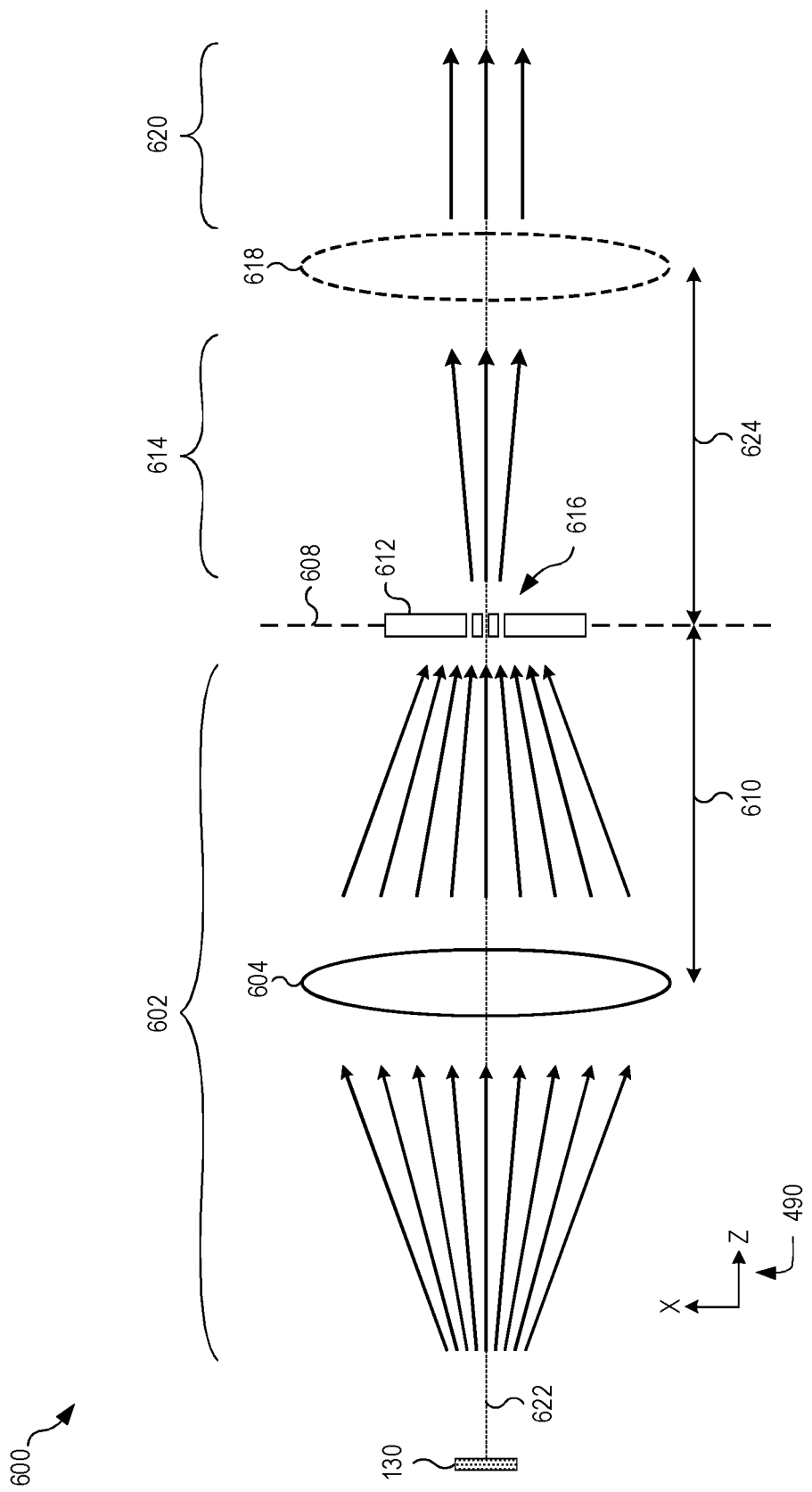
FIG. 6 illustrates, in cross-sectional side view, a Fourier filter configured to spatially filter modulated light received from a mechanical amplitude SLM, according to an embodiment.

FIG. 6 illustrates, in cross-sectional side view, one Fourier filter 600 configured to spatially filter modulated light 602 received from mechanical amplitude SLM 130, so as to increase PCR of an embodiment of laser projector 100. Fourier filter 600 is an embodiment of filter 140 and may be implemented in any one of dual-modulation systems 102, 200, and 300 to filter combined modulated light 190 or 290.

Fourier filter 600 includes a lens 604 and a mask 612. Lens 604 spatially Fourier transforms modulated light 602 by focusing modulated light 602 onto a Fourier plane 608. Lens 604 has focal length 610, and Fourier plane 608 coincides with a focal plane of lens 604. Modulated light 602 is depicted in FIG. 6 as a plurality of arrows that each corresponds to a respective diffraction order and points in a unique direction along which the diffraction order propagates. The spatial Fourier transformation imposed by lens 604 converts the propagation angle of each diffraction order of modulated light 602 to a respective spatial position on Fourier plane 608. Lens 604 thereby enables selection of desired diffraction orders, and rejection of undesired diffraction orders. Accordingly, a mask 612 at Fourier plane 608 spatially filters modulated light 602, as Fourier transformed by lens 604, to select one or more diffraction orders of modulated light 602 while blocking the remaining diffraction orders of modulated light 602. The spatial Fourier transform of modulated light 602 at Fourier plane 608 is equivalent to a Fraunhofer diffraction pattern of modulated light 602.

Lens 604 defines an optical axis 622. In one implementation, mechanical amplitude SLM 130 is centered on optical axis 622, as shown in FIG. 6. In another implementation, mechanical amplitude SLM 130 is off-centered from optical axis 622.

Mask 612 has at least one transmissive region 616 configured to fully or partly transmit at least one diffraction order of modulated light 602 through mask 612 as filtered light 614. In certain embodiments, mask 612 is substantially opaque where undesired diffraction orders of modulated light 602 are incident. In some embodiments, mask 612 is substantially opaque where mask 612 does not have a transmissive region 616. In other embodiments, mask 612 is configured to reflect, as opposed to transmit, desired diffraction orders so as to spatially separate desired diffraction orders from undesired diffraction orders.

Mask 612 may be formed from metal, such as aluminum or stainless steel. The metal may be anodized or blackened to enhance absorption of light blocked by mask 612. Alternatively, mask 612 may be formed from a semiconductor substrate, such as silicon, into which transmissive region 616 is etched or grinded. In another embodiment, mask 612 is formed from an optically transparent substrate (e.g., glass) that is coated with an optically absorbing material (e.g., black paint) to block light in areas not coinciding with transmissive region(s) 616. In another embodiment, mask 612 is an active mask having dynamically configurable transmissive regions 616, such as an array of electronically controlled mirrors.

In an embodiment, Fourier filter 600 is configured with a collimation lens 618 that collimates filtered light 614 into collimated light 620. Collimation lens 618 may ease integration of Fourier filter 600 with other optical elements or optical systems. For example, collimation lens 618 may optically couple filtered light 614 to additional optics located after Fourier filter 600 (e.g., projection optics 150, or beam combiner 1704 discussed below in reference to FIG. 17). Collimation lens 618 has a focal length 624, and is positioned such that a focal plane of collimation lens 618 coincides with Fourier plane 608. While focal lengths 610 and 624 are shown in FIG. 6 as being equal, focal lengths 610 and 624 may differ from each other in certain embodiments.

For clarity, FIG. 6 only shows diffracted beams diffracting in one dimension (e.g., the x-dimension). However, mechanical amplitude SLM 130 diffracts in two dimensions, such that modulated light 602 also includes diffracted beams that have been diffracted, by mechanical amplitude SLM 130, in a second dimension perpendicular to optical axis 622 (e.g., the y-dimension). Each diffracted beam in a two-dimensional diffraction pattern may be labeled by a pair of integers identifying the diffraction order of the diffracted beam for each of the two dimensions. Herein, "zeroth order" refers to the one diffracted beam that has order zero in both of the two dimensions.

Figure 7:
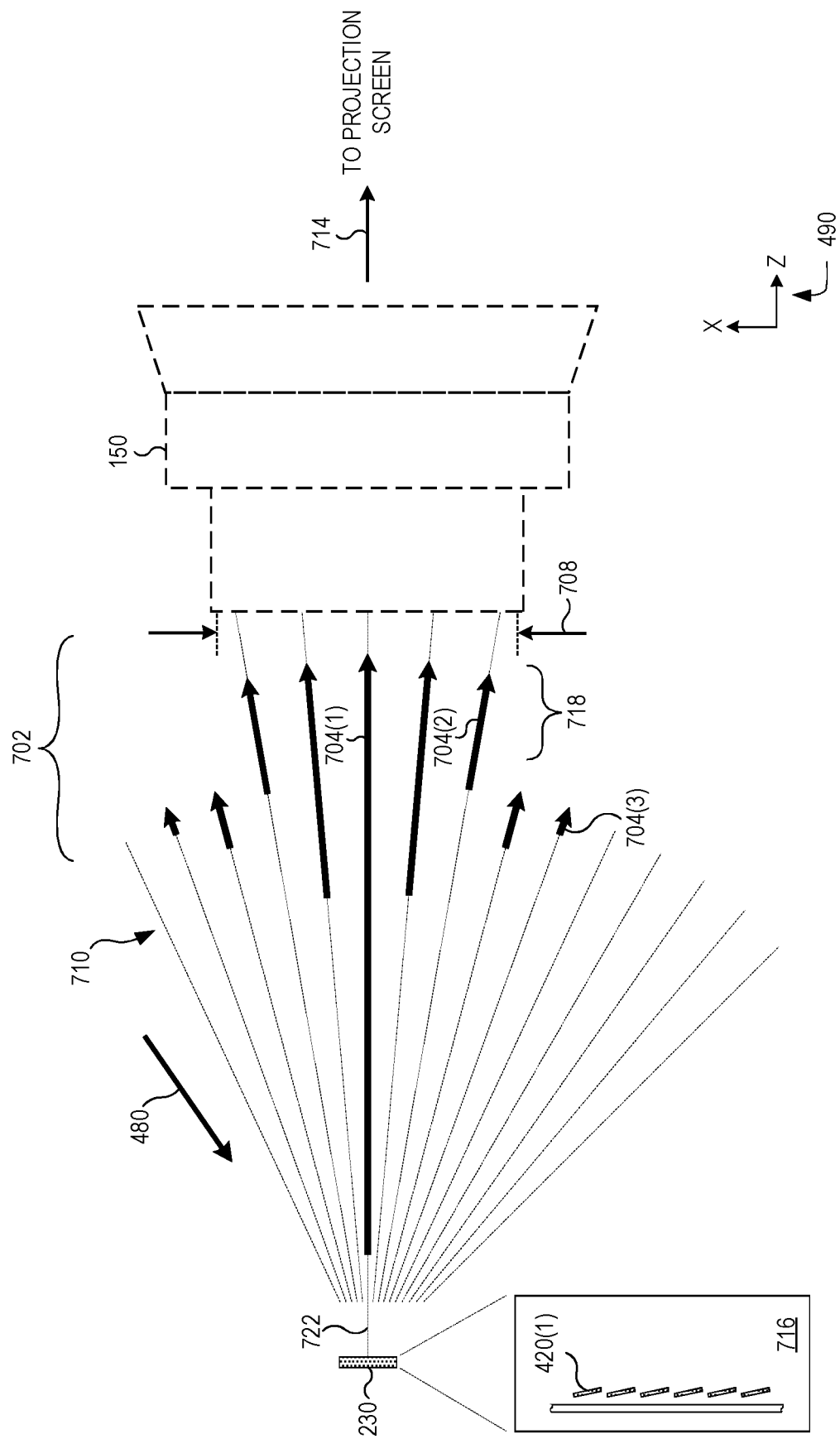
FIGS. 7 and 8 illustrate example diffraction behavior by a DMD.
Figure 8:
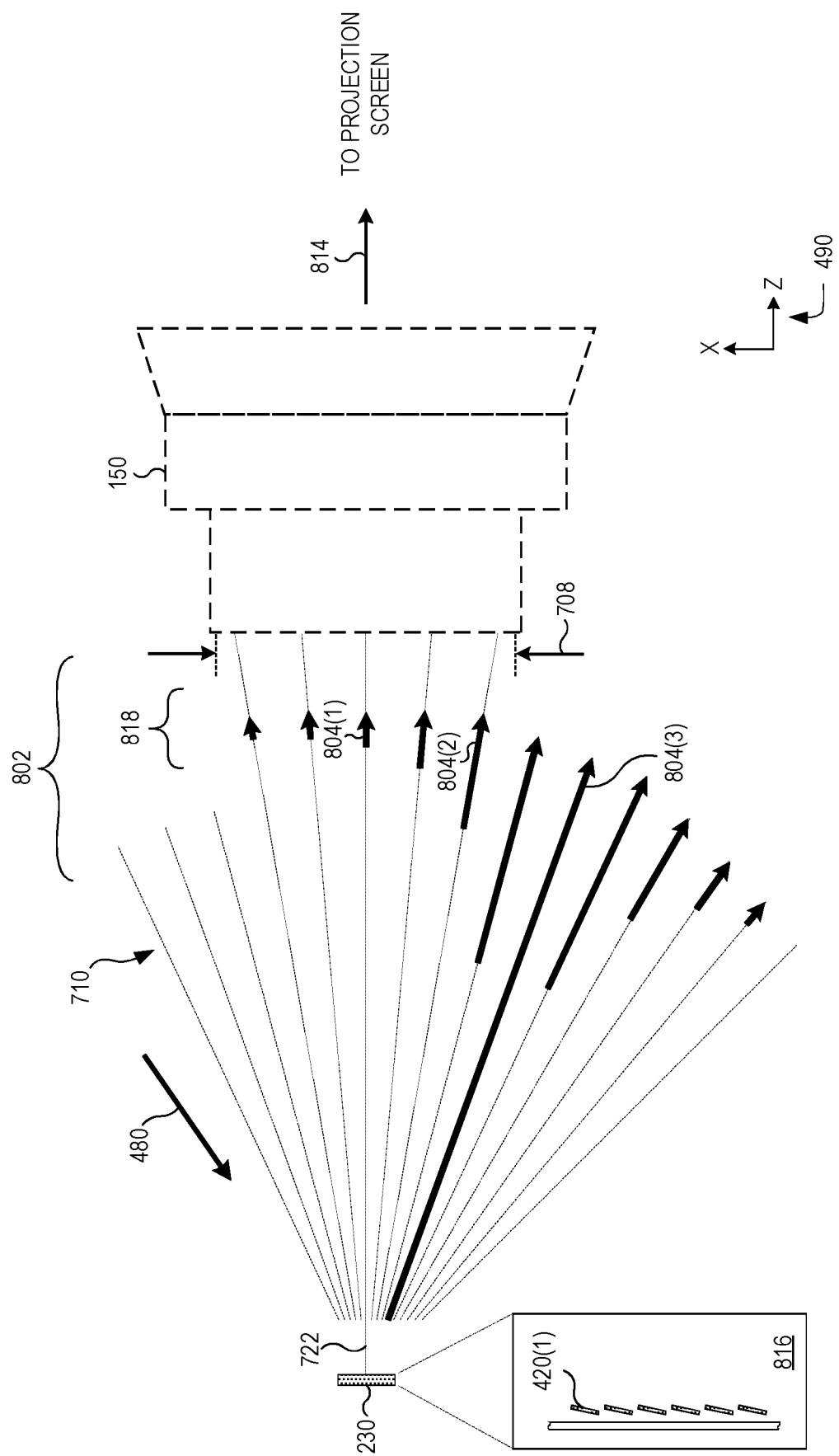

FIGS. 7 and 8 illustrate example diffraction behavior by DMD 230. FIGS. 7 and 8 are best viewed together in the following description. FIGS. 7 and 8 show, by example, how diffraction orders of modulated light outputted by DMD 230 reduce PCR of a laser projector not equipped with filter 140.

FIG. 7 shows, in side view, DMD 230 outputting ON luminous intensity by actuating all micromirrors 420 of DMD 230 in the ON position (see micromirror 420(1) in magnified view 716). FIG. 8 shows, also in side view, DMD 230 outputting OFF luminous intensity by actuating all micromirrors 420 of DMD 230 in the OFF position (see micromirror 420(2) in magnified view 816).

In FIG. 7, DMD 230 diffracts input light 480 into ON-modulated light 702 having a plurality of ON-diffraction beams 704. In FIG. 8, DMD 230 diffracts input light 480 into OFF-modulated light 802 having a plurality of OFF-diffraction beams 804. In a far-field region of DMD 230, each of ON-diffracted beams 704 corresponds to one diffraction order or peak of a Fraunhofer diffraction pattern formed by ON-modulated light 702, and each of OFF diffracted beams 804 corresponds to one diffraction order or peak of a Fraunhofer diffraction pattern formed by OFF-modulated light 802. In the far-field region of DMD 230, each of ON and OFF diffracted beams 704, 804 corresponds to a k-vector having one of a plurality of propagation directions 710. In the example of FIGS. 7 and 8, propagation directions 710 are represented as dashed lines; each of ON- and OFF-diffracted beams 704, 804 is aligned with one of propagation directions 710 and is represented by a solid arrow having a length corresponding to a power or intensity of the diffracted beam.

For a fixed direction of input light 480, the power of ON- and OFF-diffracted beams 704, 804 changes when micromirrors 420 of DMD 230 are switched between ON and OFF positions, whereas propagation directions 710 of ON- and OFF-diffracted beams 704, 804 remain the same when micromirrors 420 of DMD 230 are switched between ON and OFF positions. In other words, the configuration of DMD 230 and the direction of input light 480 define the set of possible propagation directions 710 of ON-diffracted beams 704 and OFF-diffracted beams 804, and the positions of micromirrors 420 determine the power distribution of DMD 230's output light across propagation directions 710.

FIGS. 7 and 8 depict a use scenario, wherein projection optics 150 collects output light from DMD 230 and projects resulting screen illumination onto a projection screen. More specifically, projection optics 150 collects light outputted by DMD 230 that falls within a clear aperture 708 of projection optics 150. Not all possible propagation directions 710 fall within clear aperture 708. This use scenario, depicted in FIGS. 7 and 8, may occur in a modification of laser projector 100 that implements DMD 230 but omits filter 140.

In the example shown in FIGS. 7 and 8, ON-modulated light 702 has significant power in several ON-diffracted beams 704, and OFF-modulated light has significant power in several OFF-diffracted beams 804. Only some of the ON-diffracted beams 704 carrying significant power fall within clear aperture 708, while others fall outside clear aperture 708. For example, a dominant ON-diffracted beam 704(1) falls within clear aperture 708, while two less powerful ON-diffracted beams 704(2) and 704(3) fall within and outside, respectively, clear aperture 708. Conversely, only some of OFF-diffracted beams 804 carrying significant power fall outside clear aperture 708, while others fall inside clear aperture 708. For example, a dominant OFF-diffracted beam 804(3) falls outside clear aperture 708, while two less powerful OFF-diffracted beams 804(1) and 804(2) both fall within clear aperture 708. In short, less than 100% of ON-modulated light 702 is projected by projection optics 150 as ON-projected light 714 resulting in an ON luminous intensity, and a non-zero fraction of OFF-modulated light 802 is projected by projection optics 150 as OFF-projected light 814 resulting in a non-zero OFF luminous intensity. Each of these two factors decrease PCR of the laser projector of this use scenario. Generally, the non-zero OFF luminous intensity is expected to have the most detrimental impact on PCR.

For clarity, FIGS. 7 and 8 only show diffracted beams 704, 804 diffracting in one dimension (the x-dimension). However, DMD 230 diffracts input light 480 in two dimensions, such that modulated light 702 and 802 also include diffracted beams that have been diffracted, by DMD 230, in a second dimension perpendicular to optical axis 722 (the y-dimension).

Referring now to FIGS. 1, 7, and 8 in combination, other embodiments of mechanical amplitude SLM 130 may exhibit diffraction behavior similar to that illustrated by FIGS. 7 and 8, and filter 140 selects which propagation directions 710 are forwarded to projection optics 150. By appropriate diffraction order selection, filter 140 may increase PCR of dual-modulation system 102 and, consequently, laser projector 100, as compared to systems that do not include filter 140.

To identify diffraction orders to filter with filter 140, diffraction order contrast ratio (DOCR) may be used. For each of propagation directions 710 passing through clear aperture 708, DOCR may be defined as a ratio of the optical powers of a pair of corresponding ON- and OFF-diffracted beams of the same diffraction order and propagation direction. For example, the diffraction order corresponding to ON- and OFF-diffracted beams 704(1) and 804(1) of FIGS. 7 and 8 has a high DOCR. Diffraction orders with high DOCR are beneficial to increasing PCR, and may be advantageously selected for projection to the projection screen. On the other hand, ON- and OFF-diffracted beams 704(2) and 804(2) correspond to a diffraction order with a low DOCR. Diffraction orders with low DOCR decrease PCR, and may be advantageously filtered out to increase PCR.

Figure 9:
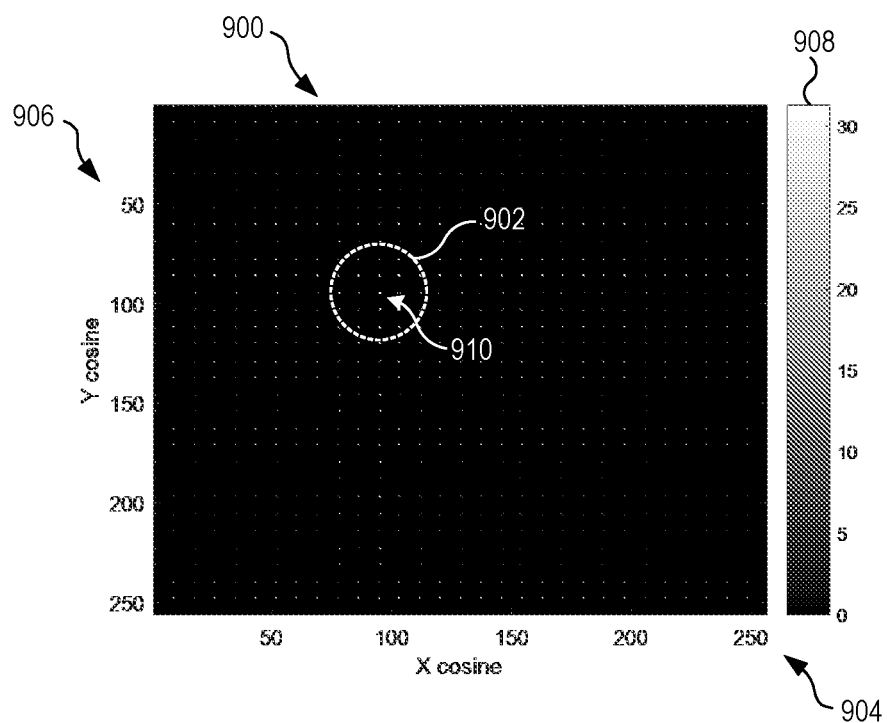
FIGS. 9 and 10 are intensity plots of example Fraunhofer diffraction patterns.
Figure 10:
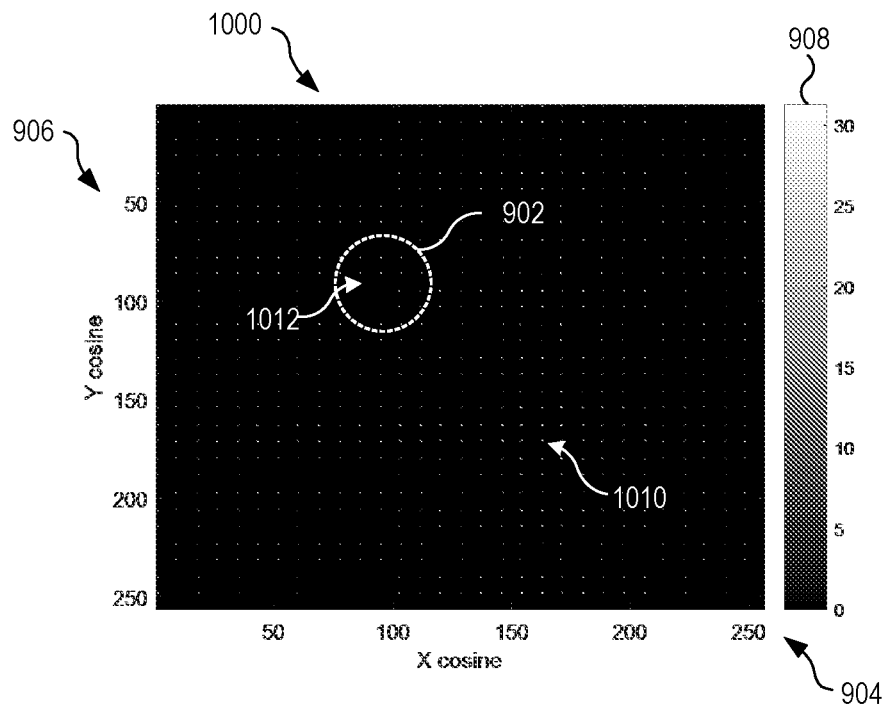

FIGS. 9 and 10 are intensity plots of example Fraunhofer diffraction patterns 900 and 1000 of ON- and OFF-modulated light 702 and 802, respectively. Diffraction patterns 900 and 1000 correspond to Fourier transforms produced by one example of lens 604 of Fourier filter 600 (FIG. 6) at Fourier plane 608. Diffraction patterns 900 and 1000 are examples of diffraction patterns produced at Fourier plane 608 when Fourier filter 600 is implemented in dual-modulation system 102, 200, or 300. Diffraction patterns 900 and 1000 thus illustrate, by example, how mask 612 of Fourier filter 600 may be configured to improve PCR.

Each of diffraction patterns 900 and 1000 includes a plurality of equally-spaced diffraction peaks that each corresponds to a respective one of diffracted beams 704 or 804 of FIGS. 7 and 8, respectively. A horizontal axis 904 and a vertical axis 906 of FIGS. 9 and 10 indicate direction cosines of diffracted peaks relative to x and y axes, respectively, of coordinate system 490. FIGS. 9 and 10 indicate intensities of diffraction patterns 900 and 1000 according to an intensity scale 908.

Circle 902 of FIGS. 9 and 10 represents clear aperture 708 of FIGS. 7 and 8. Diffraction peaks lying within circle 902 represent diffraction beams 718, 818 that, in the absence of Fourier filter 600 or another embodiment of filter 140, would be projected by projection optics 150 as ON- and OFF-projected light 714 and 814, respectively. In FIG. 9, a brightest (e.g., highest intensity) diffraction peak 910 at a center of circle 902 corresponds to ON-diffraction beam 704(1) of FIG. 7 and/or a zeroth order of ON-modulated light 702. Diffraction peaks lying outside of circle 902 will not be projected onto the projection screen.

In FIG. 10, a brightest diffraction peak 1010, corresponding to OFF-diffracted beam 804(3), is at higher values of directional cosines outside circle 902, and therefore will not be projected onto the projection screen. However, at least in the absence of Fourier filter 600 or another embodiment of filter 140, a plurality of low-power diffraction peaks 1012 in circle 902 would be projected onto projection screen as OFF-projected light 814, increasing OFF luminous intensity and decreasing PCR.

To increase PCR, Fourier filter 600 may reduce OFF-luminous intensity by blocking diffraction orders lying within circle 902 that contribute relatively more to OFF luminous intensity than ON luminous intensity. Fraunhofer diffraction patterns 900 and 800 are representative of Fourier transforms of modulated light 602, and illustrate how transmissive regions 616 may be configured so that mask 612 transmits desired diffraction orders for projection, and blocks all other undesired diffraction orders that otherwise would be projected. Specifically, using parameters of lens 604, the direction cosines associated with each desired diffraction peak may be converted to a spatial position on mask 612 at which a transmissive region 616 may be positioned so as to transmit the desired diffraction peak through mask 612. Similarly, the direction cosines associated with each undesired diffraction peak may be converted to a spatial position on mask 612 at which mask 612 is opaque, so as to block (e.g., filter) the undesired diffraction peak.

In one embodiment of Fourier filter 600, mask 612 includes one transmissive region 616 having size, geometry, location, and orientation selected to optimize PCR and/or optical power efficiency of dual-modulation system 102 and laser projector 100. In another embodiment of Fourier filter 600, mask 612 has a plurality of transmissive regions 616, and size, geometry, location, and orientation are selected for each transmissive region 616 to optimize PCR and/or optical power efficiency of dual-modulation system 102 and laser projector 100.

FIGS. 11-16 are front views of examples of mask 612 of FIG. 6, showing example configurations of transmissive region(s) 616. In each of FIGS. 11-16, a plurality of locations of diffraction orders, such as diffraction orders associated with different pairs of corresponding ON- and OFF-diffracted beams 704 and 804, are indicated by X's forming a two-dimensional grid. For example, in FIG. 11, location 1102(2) indicates one diffraction order blocked by a mask 1100, while location 1102(1) indicates one diffraction order transmitted by mask 1100.

Figure 11:
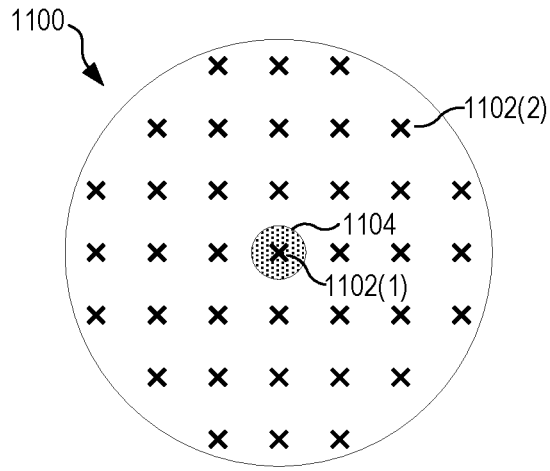
FIGS. 11-16 are front views of examples of a mask the Fourier filter of FIG. 6.
Figure 12:
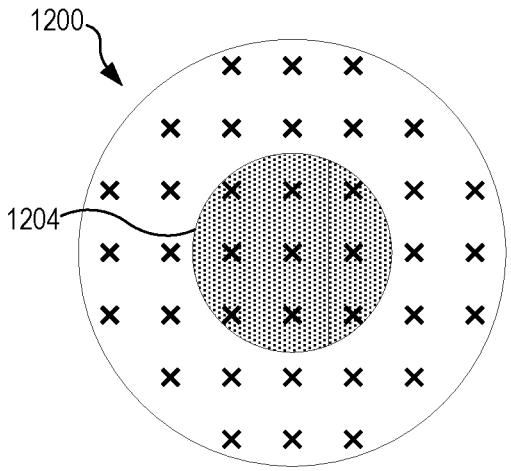

FIGS. 11 and 12 show example masks 1100 and 1200 having circular transmissive regions 1104 and 1204, respectively. Each of circular transmission regions 1104 and 1204 may be a hole or a material that is at least partly transmissive to light. Circular transmissive regions 1104 and 1204 are examples of transmissive region 616. Circular transmissive region 1104 is sized to transmit one diffraction order through mask 1100. Circular transmissive region 1204 is sized to transmit a plurality of diffraction orders through mask 1200, for example nine diffraction orders forming a 3×3 grid, as shown in FIG. 12. Although FIGS. 11 and 12 show circular transmissive regions 1104 and 1204 as being centered on masks 1100 and 1200, respectively, circular transmissive regions 1104 and 1204 may be off-centered without departing from the scope hereof.

Figure 13:
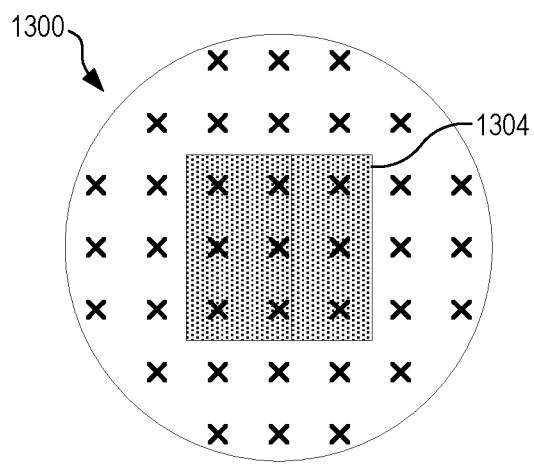
Figure 14:
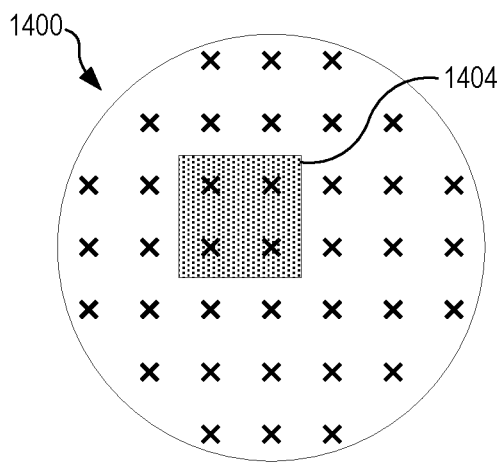

FIGS. 13 and 14 show example masks 1300 and 1400 having square transmissive regions 1304 and 1404, respectively. Each of square transmission regions 1304 and 1404 may be a hole or a material that is at least partly transmissive to light. Square transmissive regions 1304 and 1404 are examples of transmissive region 616. Square transmissive region 1304 is centered on mask 1300 and is sized to transmit a plurality of diffraction orders through mask 1300, such as nine diffractions orders forming a 3×3 grid, as shown in FIG. 13. Square transmissive region 1404 is off-centered on mask 1400 and is sized to transmit a plurality of diffraction orders through mask 1400, such as four diffraction orders forming a 2×2 grid.

Figure 15:
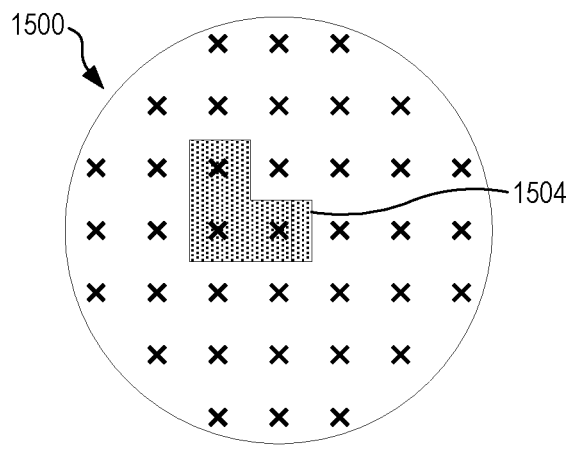

FIG. 15 shows an example mask 1500 having an irregular polygonal transmissive region 1504 configured to transmit three neighboring diffraction orders through mask 1500. Irregular polygonal transmissive region 1504 is an example of transmissive region 616 and may be a hole or a material that is at least partly transmissive to light.

Figure 16:
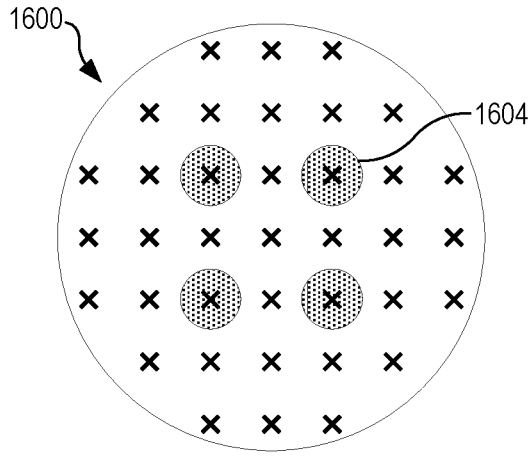

FIG. 16 shows an example mask 1600 having a plurality of circular transmissive regions 1604, each positioned and sized to transmit one diffraction order through mask 1600, such as four transmissive regions 1604. Circular transmissive regions 1604 are an example of a plurality of transmissive regions 616.

Transmissive region 616 may have another shape, size, and location than shown in the examples of FIGS. 11-16 without departing from the scope hereof. In one class of implementations, each of the examples of transmissive regions 616 shown in FIGS. 11-16 is a hole formed in mask 612 (e.g., by drilling, milling, or etching). In another class of implementations, each of the examples of transmissive regions 616 shown in FIGS. 11-16 is an optically transparent window, an optically semi-transparent window, or a color filter (e.g., dichroic filter or thin-film filter) physically coupled to mask 612 or embedded within mask 612. In the examples of FIGS. 11-16, masks (e.g., mask 1100) are circularly shaped. Each of these masks may instead have another shape (e.g. square or rectangular) without departing from the scope hereof. When implemented in Fourier filter 600, the masks of FIGS. 11-16 may be centered on optical axis 622 or off-centered from optical axis 622.

Figure 17:
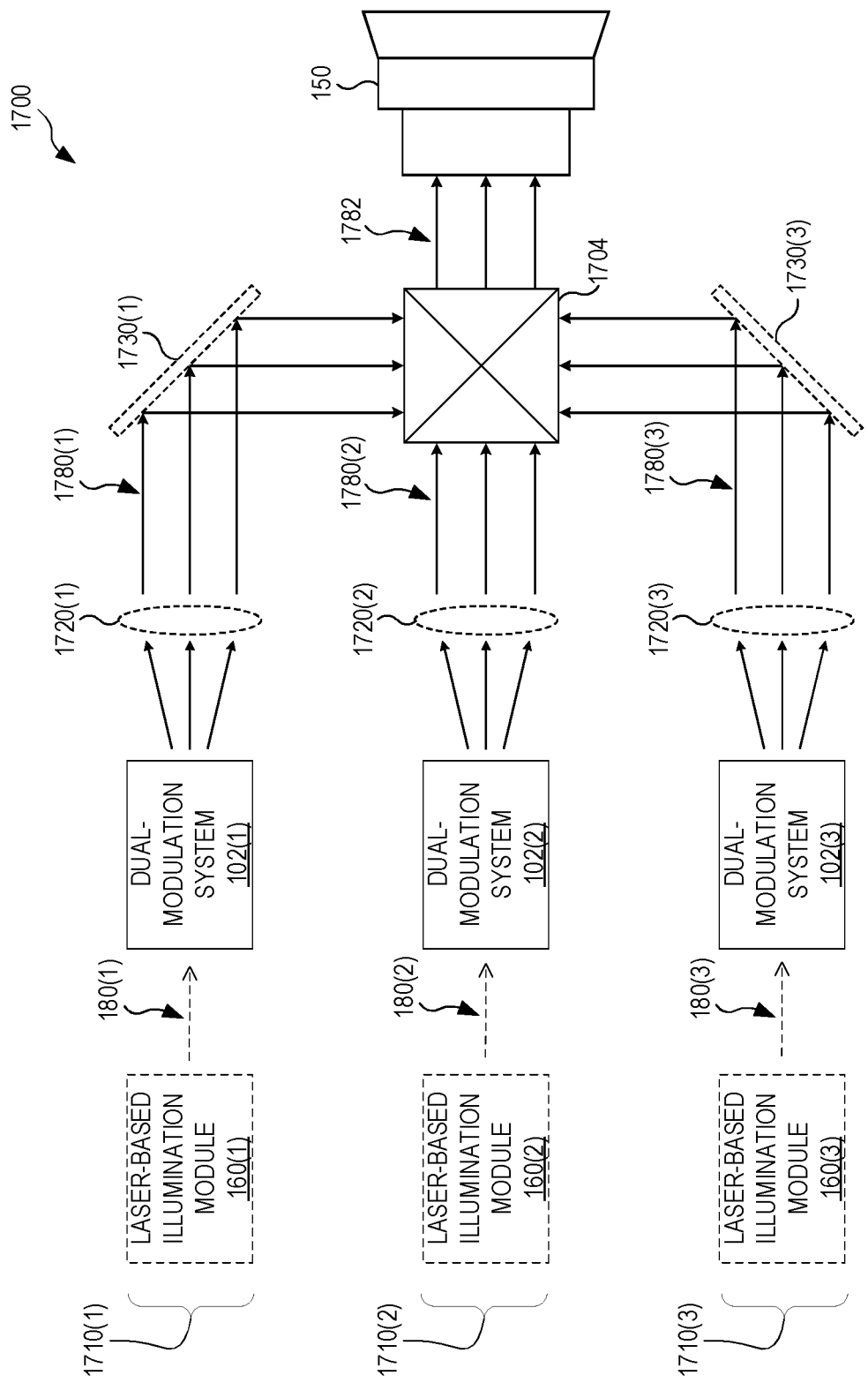
FIG. 17 illustrates a polychromatic laser projector having dual-modulation and diffraction-order filtering in each individual color channel prior to combination of the different colors, according to an embodiment.

FIG. 17 illustrates one polychromatic laser projector 1700 having dual-modulation and diffraction-order filtering in each individual color channel prior to combination of the different colors. Laser projector 1700 is an extension of laser projector 100 configured to process multiple colors and output polychromatic light. FIG. 17 shows laser projector 1700 as having three color channels 1710(1), 1710(2), and 1710(3). These three color channels may be red, green, and blue. However, without departing from the scope hereof, laser projector 1700 may be configured with only two color channels 1710 or more than three color channels 1710. Each color channel 1710 includes a respective instance of dual-modulation system 102. Each individual color channel 1710 of laser projector 1700 therefore benefits from the dual-modulation and filtering provided by dual-modulation system 102. Each color channel 1710 further includes a respective collimation lens 1720 or, alternatively, filter 140 of each dual-modulation system 102 includes a collimation lens (e.g., collimation lens 618). Thus, each color channel 1710 outputs monochromatic, modulated, filtered light 1780 that is collimated. In certain embodiments, each color channel 1710 further includes a respective laser-based illumination module 160 that provides laser light 180 to the corresponding instance of dual-modulation system 102. Alternatively, laser projector 1700 is configured to receive laser light 180 from third-party laser-based illumination sources.

Laser projector 1700 also includes a beam combiner 1704 and a single instance of projection optics 150. Beam combiner 1704 combines light 1780 from each color channel 1710 to produce polychromatic light 1782. Projection optics 150 projects polychromatic light 1782 onto a screen not shown in FIG. 17, such as screen 152. While shown in FIG. 17 as a cross dichroic (or x-cube) prism, beam combiner 1704 may be another type of beam combiner known in the art, such as a first dichroic beam combiner that combines two color channels 1710 followed by a second dichroic beam combiner that further couples in a third color channel 1710. Laser projector 1700 may further include mirrors 1730, or other beam-steering elements, to direct light 1780 to beam combiner 1704.

Each color channel 1710 may be specifically optimized for processing of its respective color. In one embodiment, each instance of filter 140 is specifically configured to filter diffraction orders of the color being processed by this instance of filter 140, so as to account for the wavelength-sensitive nature of diffraction. For example, when implementing Fourier filter 600 in each instance of dual-modulation system 102, each corresponding instance of mask 612 may be specifically configured to optimally filter diffraction orders of the particular color being processed by the color channel.

Without departing from the scope hereof, certain functionality of dual-modulation systems 102 may be moved out of the individual instances of dual-modulation system 102 and instead placed between beam combiner 1704 and projection optics 150. In one such embodiment, each dual-modulation system 102 omits mechanical amplitude SLM 130 and filter 140, and a single mechanical amplitude SLM 130 and a single filter 140 is positioned in the combined light path between beam combiner 1704 and projection optics 150 to process all three colors together. Also without departing from the scope hereof, polychromatic laser projector 1700 may be provided without any instances of filter 140.

Figure 18:
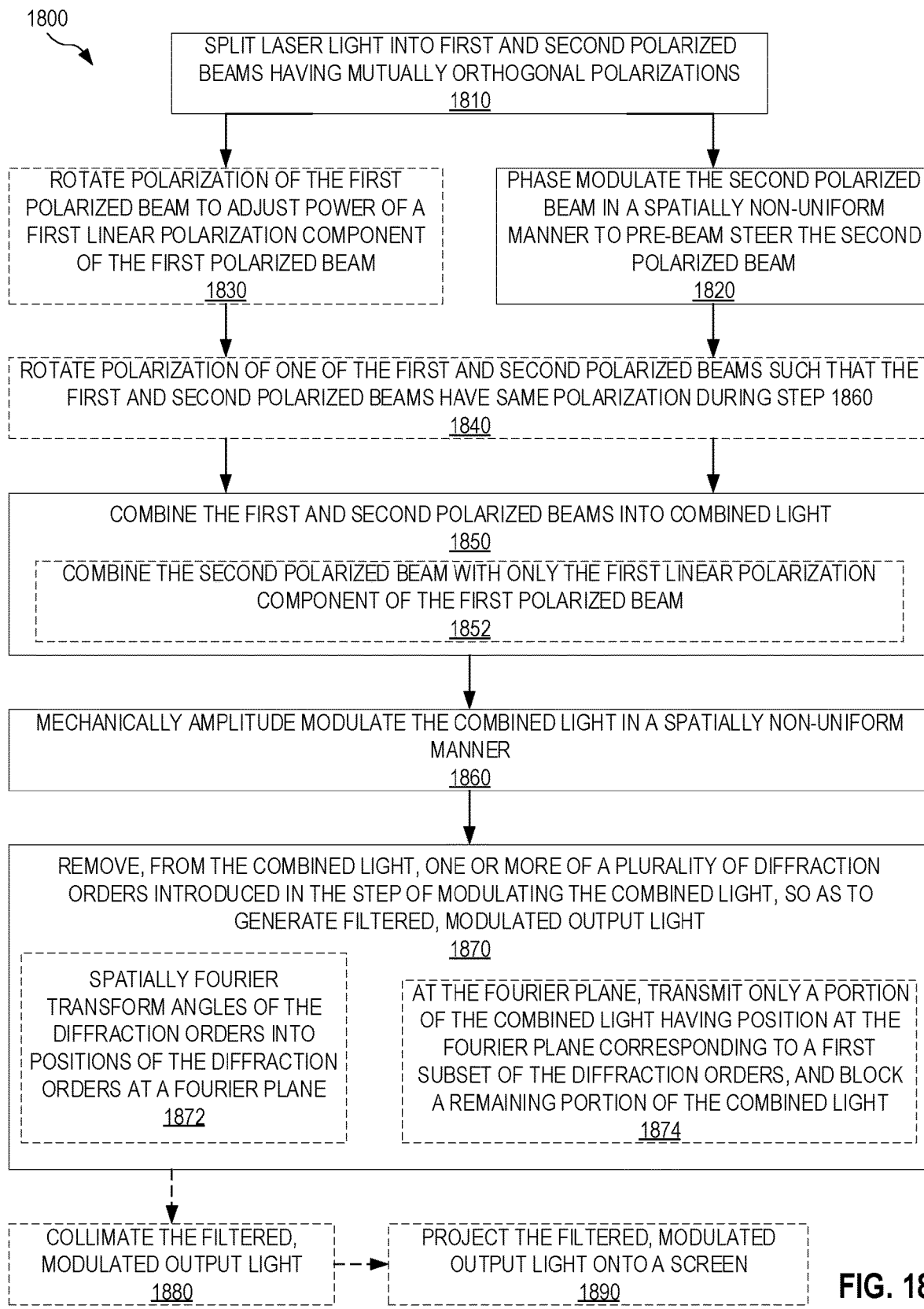
FIG. 18 illustrates a dual-modulation laser-projection method, according to an embodiment.

FIG. 18 illustrates one dual-modulation laser-projection method 1800. Method 1800 may be performed by dual-modulation system 102 or laser projector 100. Method 1800 includes steps 1810, 1820, 1850, 1860, and 1870.

Step 1810 splits laser light into first and second polarized beams having mutually orthogonal polarizations. In one example of step 1810, PBS 110 splits laser light 180 into polarized beams 182 and 184, as discussed above in reference to FIG. 1.

Step 1820 phase modulates the second polarized beam in a spatially non-uniform manner to pre-beam steer the second polarized beam. In one example of step 1820, phase SLM 120 modulates polarized beam 184 to produce pre-beam steered polarized beam 186, as discussed above in reference to FIG. 1.

Step 1850 combines the first and second polarized beams into combined light. In one example of step 1850, dual-modulation system 102 combines polarized beams 182 and 186 on or before mechanical amplitude SLM 130, as discussed above in reference to FIG. 1. In another example of step 1850, polarizing beam combiner 222 combines polarized beams 182 and 286 to produce combined beam 288, as discussed above in reference to FIG. 2. In yet another embodiment, polarized beams 182 and 286 are combined directly on DMD 230, as discussed above in reference to FIG. 3.

Step 1860 mechanically amplitude modulates the combined light, formed in step 1850, in a spatially non-uniform manner. In one example of step 1860, mechanical amplitude SLM 130 modulates a combination of polarized beams 182 and 186 to produced combined modulated light 190, as discussed above in reference to FIG. 1. In another example of step 1860, DMD 230 modulates a combination of polarized beams 182 and 286 to produce combined modulated light 290, as discussed above in reference to FIGS. 2 and 3.

Step 1870 removes, from the combined light produced in step 1850, one or more of a plurality of diffraction orders introduced in step 1860, so as to generate filtered, modulated output light. In one example of step 1870, filter 140 removes one or more diffraction orders from combined modulated light 190, as discussed above in reference to FIG. 1 and further elaborated upon in reference to FIGS. 7 and 8. In another example of step 1870, Fourier filter 600 spatially filters modulated light 602 to produce filtered light 614, as discussed above in reference to FIG. 6 and further elaborated upon in reference to FIGS. 7-16.

In one embodiment, step 1870 includes steps 1872 and 1874. Step 1872 spatially Fourier transforms angles of the diffraction orders into positions of the diffraction orders at a Fourier plane. In one example of step 1872, lens 604 Fourier transforms modulated light 602 onto Fourier plane 608, as discussed above in reference to FIG. 6 and further elaborated upon in reference to FIGS. 9 and 10. Step 1874 transmits, at the Fourier plane, only a portion of the combined light having position at the Fourier plane corresponding to a first subset of the diffraction orders, and blocks a remaining portion of the combined light. In one example of step 1874, mask 612 (a) transmits diffraction orders associated with one or more, but not all, propagation directions 710 and (b) blocks remaining diffraction orders, as discussed above in reference to FIG. 6 and further elaborated upon in reference to FIGS. 9-16.

Method 1800 may further include a step 1890 of projecting the filtered, modulated output light, generated in step 1870, to a screen. In one example of step 1890, projection optics 150 projects light field 192 onto screen 152. Method 1800 may also include a step 1880 that collimates the filtered, modulated output light generated in step 1870. In one example of step 1880, collimation lens 618 collimates filtered light 614, as discussed above in reference to FIG. 6. In another example of step 1880, light field 192 is collimated by a collimation lens incorporated in filter 140 or positioned between filter 140 and projection optics 150, as discussed above in reference to FIG. 1.

In certain embodiments, method 1800 further includes a step 1830 and step 1850 implements a step 1852. Step 1830 rotates the polarization of the first polarized beam to adjust power of a first linear polarization component of the first polarized beam. Step 1852 combines the second polarized beam with only the first linear polarization component of the first polarized beam. In one example of steps 1830 and 1852, dimming optic 212 is implemented as a variable polarization rotator that, in step 1830, rotates the polarization of polarized beam 182 to adjust the power of a first linear polarization component of polarized beam 182 before polarizing beam combiner 222, in step 1852 and by virtue of being polarization selective, combines polarized beam 286 with only the first linear polarization component of polarized beam 182, as discussed above in reference to FIG. 2. In another example of steps 1830 and 1852, variable polarization rotator 312, in step 1830, rotates the polarization of polarized beam 182 to adjust the power of a first linear polarization component of polarized beam 182 before polarizer 314, in step 1852, transmits only the first linear polarization component of polarized beam 182 to DMD 230, as discussed above in reference to FIG. 3.

Method 1800 may include a step 1840 that is performed after step 1810 and before step 1850, for example but not necessarily between steps 1820 and 1850 as shown in FIG. 18. Step 1840 rotates the polarization of one of the first and second polarized beams such that the first and second polarized beams have the same polarization during step 1860. In one example of step 1840, polarizer 314 of dual-modulation system 300 is configured such that the polarization direction of polarized beam 182, after polarizer 314, is rotated by ninety degrees compared to the polarization direction of polarized beam 182 at the output of PBS 110, as discussed above in reference to FIG. 3. In another example of step 1840, dual-modulation system 300 implements a half-wave plate in either (a) the path of polarized beam 182 or (b) the path of one of polarized beams 184 and 286, as also discussed above in reference to FIG. 3.

Figure 19:
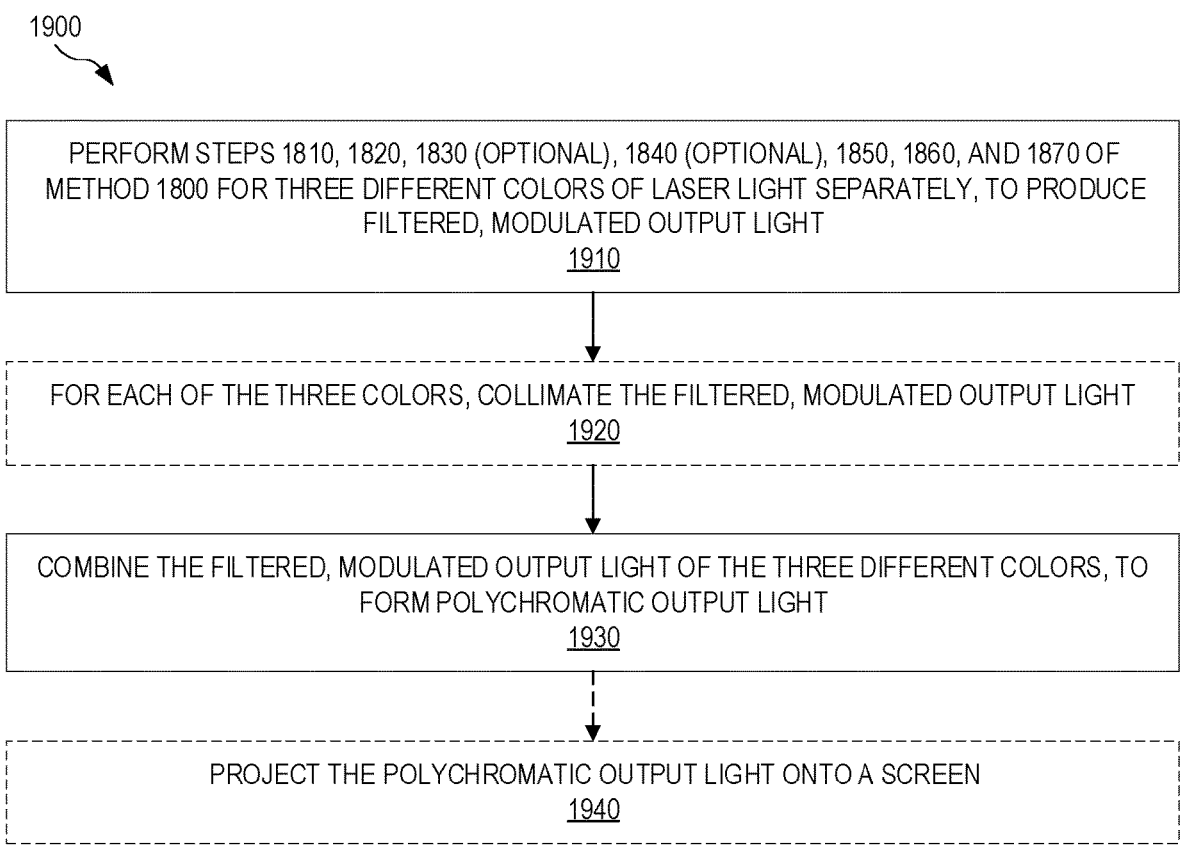
FIG. 19 illustrates a polychromatic, dual-modulation laser-projection method, according to an embodiment.

FIG. 19 illustrates one polychromatic, dual-modulation laser-projection method 1900. Method 1900 is an extension of method 1800 and is, for example, performed by polychromatic laser projector 1700. Method 1900 includes steps 1910 and 1930. Step 1910 performs an embodiment of method 1800 for three different colors of laser light separately to produce filtered, modulated output light of each of the three different colors. The embodiment of method 1800 performed in step 1910 concludes with step 1870 and does not include steps 1880 and 1890. Step 1910 may include one or both of steps 1830 and 1840. In one example of step 1910, each instance of dual-modulation system 102 modulates and filters laser light 180 of a respective one of the three colors to light 1780 of the respective one of the three colors, as discussed above in reference to FIG. 17.

Step 1930 combines the filtered, modulated output light of the three different colors (as generated in step 1910), to form polychromatic output light. In one example of step 1930, beam combiner 1704 combines the three different colors of light 1780 received from color channels 1710 to form polychromatic light 1782, as discussed above in reference to FIG. 17.

In one embodiment, method 1900 includes a step 1920. Step 1920 collimates the filtered, modulated output light for each of the three colors, separately. In one example of step 1920, each color of light 1780 is collimated by a respective instance of collimation lens 1720 or by a collimation lens included in the respective instance of dual-modulation system 102, as discussed above in reference to FIG. 17.

Method 1900 may further include a step 1940 of projecting the polychromatic output light onto a screen. In one example of step 1940, projection optics 150 projects polychromatic light 1782 onto a screen, as discussed above in reference to FIG. 17.

Method 1900 is readily extended to processing of only two different colors or more than three different colors.

Figure 20:
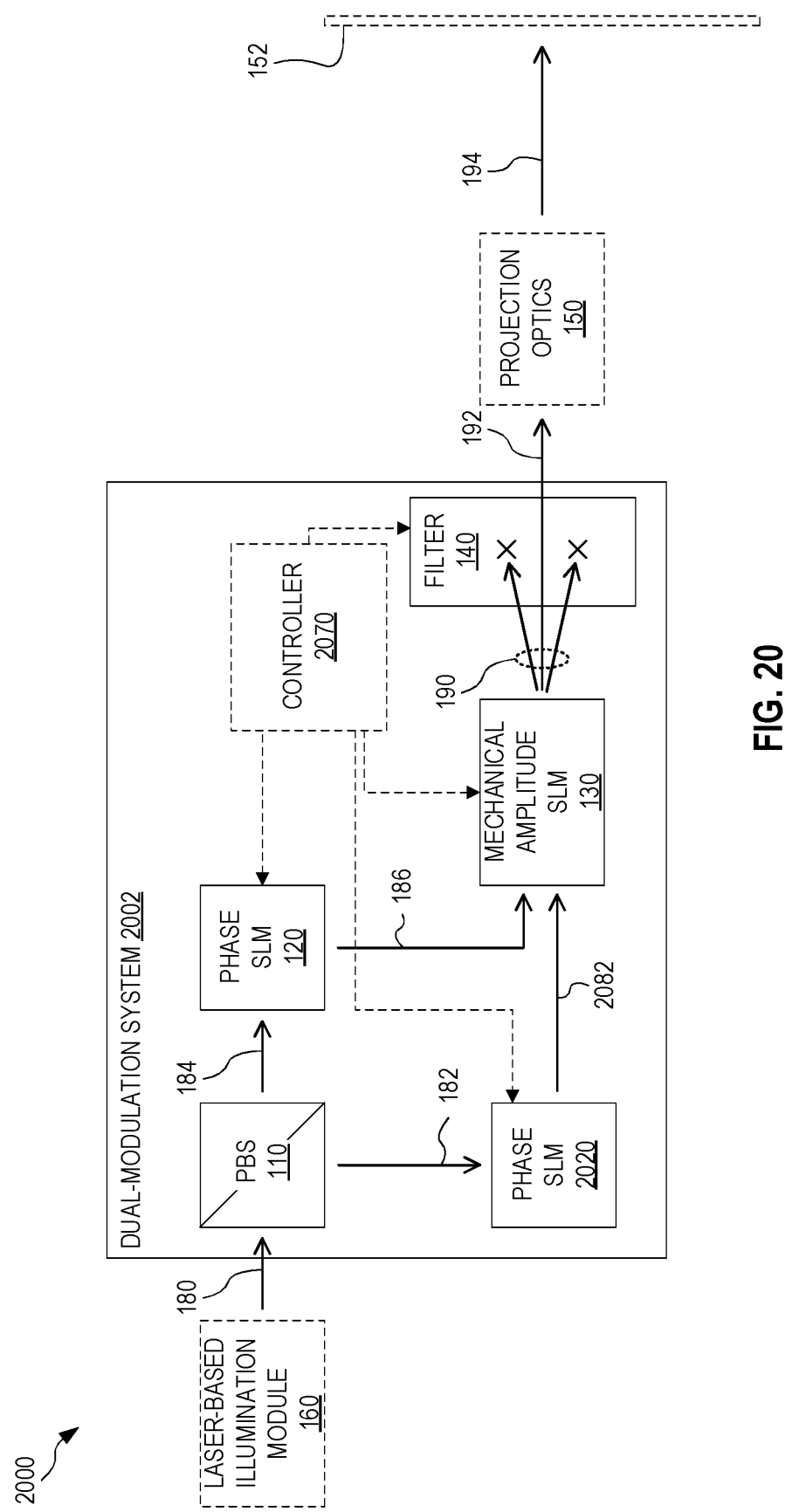
FIG. 20 illustrates a dual-modulation system with separate phase modulation and resulting pre-beam steering of both polarization components of the input laser light, according to an embodiment.

FIG. 20 illustrates one dual-modulation system 2002 with separate phase modulation and resulting pre-beam steering of both polarization components of the input laser light. Dual-modulation system 2002 is an extension of dual-modulation system 102 that further includes a second phase SLM 2020 in the path of polarized beam 182. Phase SLM 2020 is similar to phase SLM 120 and modulates phases of polarized beam 182 to beam steer a resulting polarized beam 2082 before mechanical amplitude SLM 130 modulates amplitudes of the combination of polarized beams 2082 and 186. Each of phase SLMs 120 and 2020 receives polarized input light, and dual-modulation system 2002 thereby achieves pre-beam steering of both polarization components of laser light 180 while avoiding the issues associated with phase modulation of unpolarized or partly polarized light using a single phase SLM.

FIG. 20 depicts dual-modulation system 2002 in one example use scenario. In this scenario, dual-modulation system 2002 is implemented in a dual-modulation digital laser projector 2000 that, in addition to dual-modulation system 2002, includes projection optics 150 for projecting light field 192 onto screen 152 as screen illumination 194. Screen illumination 194 produces an image on screen 152. Laser projector 2000 may further include laser-based illumination module 160 for generating laser light 180.

As compared to dual-modulation system 102, dual-modulation system 2002 offers a higher degree of beam steering, since both polarization components of laser light 180 are subjected to phase modulation. However, when lower cost and/or simplicity are desirable, dual-modulation system 102 may be preferred over dual-modulation system 2002.

Dual-modulation system 2002 replaces optional controller 170 of dual-modulation system 102 with an optional controller 2070 that is similar to controller 170 except for further controlling phase SLM 2020.

Figure 21:
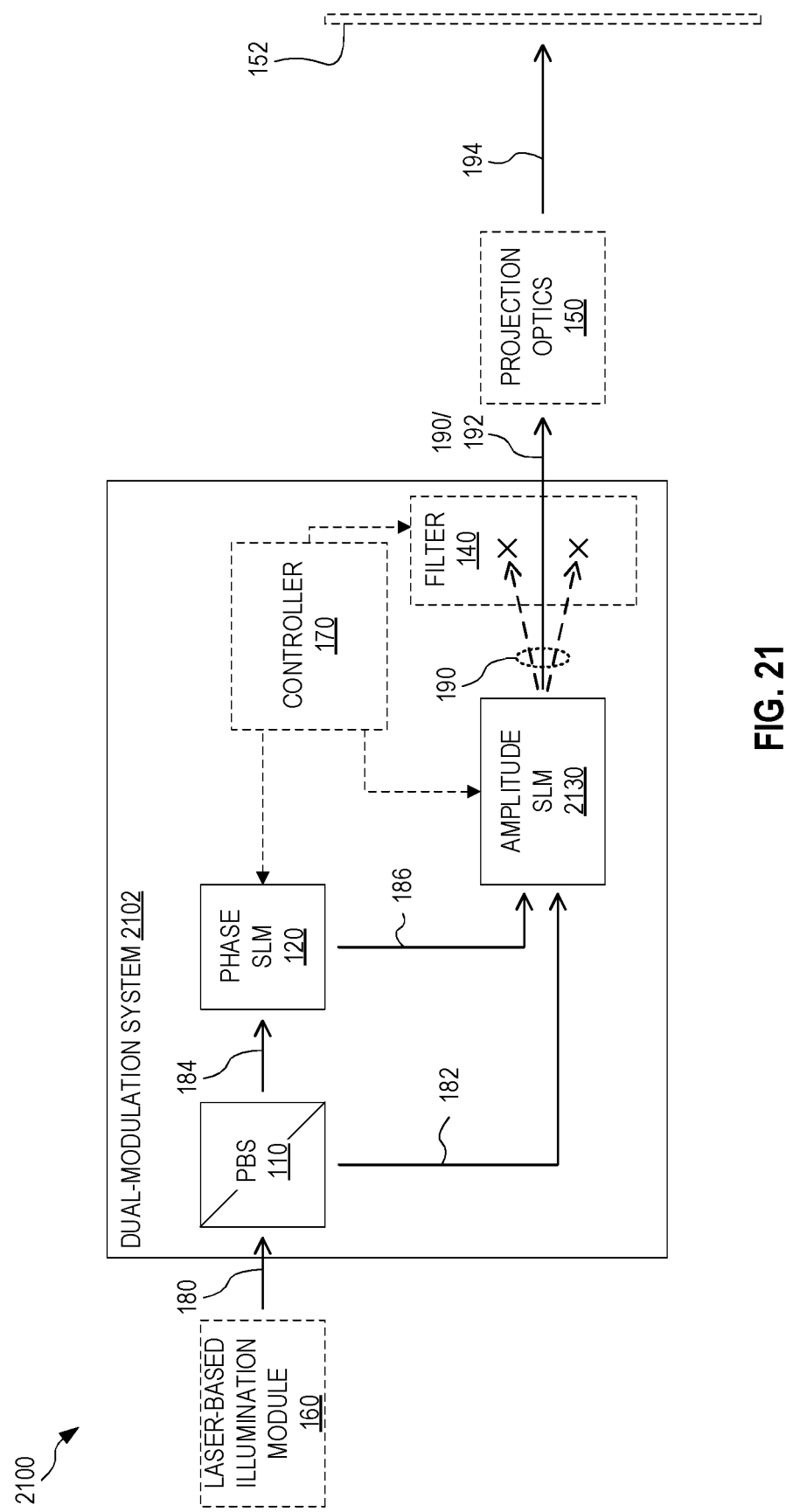
FIG. 21 illustrates another dual-modulation system, according to an embodiment.

FIG. 21 illustrates another dual-modulation system 2102. Dual-modulation system 2102 is similar to dual-modulation system 102 except that (a) filter 140 may be omitted in some embodiments and (b) mechanical amplitude SLM 130 is replaced by an amplitude SLM 2130 that may be mechanical or non-mechanical.

When non-mechanical, amplitude SLM 2130 may be a liquid crystal SLM, such as an LCOS or a transmissive LC panel configured for amplitude modulation. Non-mechanical embodiments of amplitude SLM 2130 may cause less diffraction than mechanical amplitude SLM 130. Therefore, in one embodiment of dual-modulation system 2102, amplitude SLM 2130 is non-mechanical and filter 140 is omitted and dual-modulation system 2102 outputs combined modulated light 190. In another embodiment of dual-modulation system 2102, amplitude SLM 2130 is implemented as mechanical amplitude SLM 130 and filter 140 is omitted nevertheless, for example to reduce cost and/or complexity when lower PCR is acceptable. In yet another embodiment of dual-modulation system 2102, amplitude SLM 2130 is non-mechanical and dual-modulation system 2102 includes filter 140 to remove one or more diffraction orders from combined modulated light 190.

FIG. 21 depicts dual-modulation system 2102 in one use scenario, wherein dual-modulation system 2102 is implemented in a dual-modulation digital laser projector 2100 that, in addition to dual-modulation system 2102, includes projection optics 150 for projecting light field 192 or combined modulated light 190 onto screen 152 as screen illumination 194. Screen illumination 194 produces an image on screen 152. Laser projector 2100 may further include laser-based illumination module 160 for generating laser light 180.

Figure 22:
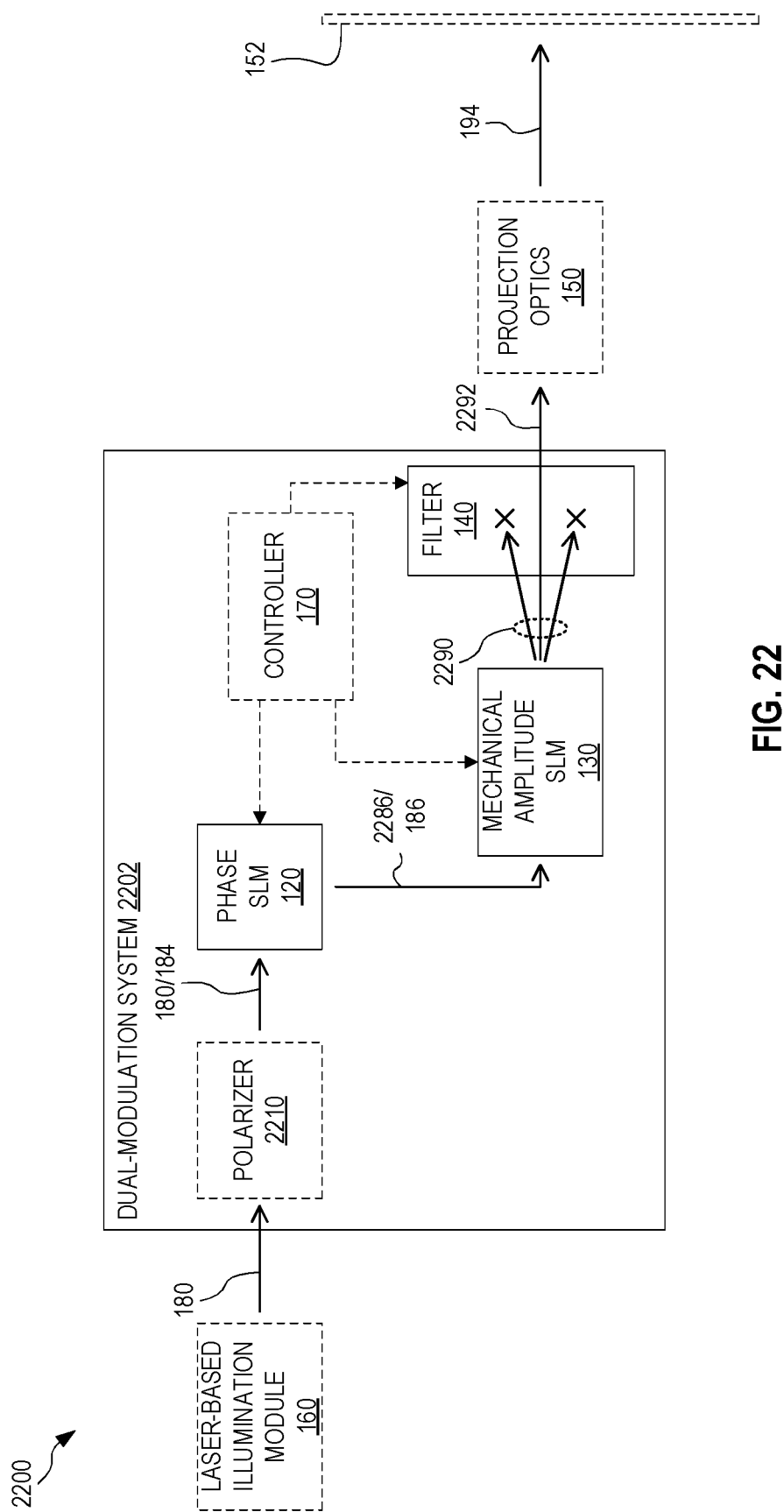
FIG. 22 illustrates a dual-modulation system having only a single modulation path, according to an embodiment.

FIG. 22 illustrates one dual-modulation system 2202 having only a single modulation path. Dual-modulation system 2202 is similar to dual-modulation system 102 apart from omitting PBS 110 and, optionally, replacing PBS 110 with a polarizer 2210.

In embodiments of dual-modulation system 2202 that do not include polarizer 2210, phase SLM 120 phase modulates laser light 180 to produce phase-modulated light 2286. Next, mechanical amplitude SLM 130 amplitude modulates phase-modulated light 2286 to produce dual-modulated light 2290. Filter 140 then filters diffraction orders of dual-modulated light 2290 to output a filtered, dual-modulated light field 2292. When laser light 180 is unpolarized or partly polarized, the phase modulation control achieved by phase SLM 120 may be less than optimal. However, for some applications, less than optimal phase modulation control may be sufficient, in which case dual-modulation system 2202 is a simpler solution than dual-modulation system 102.

In certain embodiments, particularly suitable for use with unpolarized or partly polarized light, dual-modulation system 2202 includes polarizer 2210. In such embodiments, polarizer 2210 selects a single polarization component of laser light 180 to form polarized beam 184. Next, polarized beam 184 is subjected to phase modulation by phase SLM 120 to form polarized beam 186, and polarized beam 186 is subjected to amplitude modulation by mechanical amplitude SLM 130 to form light field 2292. Light field 2292 is then filtered by filter 140, as discussed above in reference to FIG. 1 for combined modulated light 190.

In scenarios where laser light 180 is polarized, the phase modulation control of phase SLM 120 is not compromised by the omission of PBS 110, and polarizer 2210 may be omitted without impacting the performance of dual-modulation system 2202.

FIG. 22 depicts dual-modulation system 2202 in one use scenario, wherein dual-modulation system 2202 is implemented in a dual-modulation digital laser projector 2200 that, in addition to dual-modulation system 2202, includes projection optics 150 for projecting light field 2292 onto screen 152 as screen illumination 194. Screen illumination 194 produces an image on screen 152. Laser projector 2200 may further include laser-based illumination module 160 for generating laser light 180.

Combinations of Features

Features described above as well as those claimed below may be combined in various ways without departing from the scope hereof. For example, it will be appreciated that aspects of one dual-modulation system, laser projector, or associated method, described herein, may incorporate features or swap features of another dual-modulation system, laser projector, or associated method described herein. The following examples illustrate some possible, non-limiting combinations of embodiments described above. It should be clear that many other changes and modifications may be made to the methods, products, and systems herein without departing from the spirit and scope of this invention:

(A1) A dual-modulation laser projection system may include a polarizing beamsplitter for splitting laser light into first and second polarized beams having mutually orthogonal polarizations, a phase SLM for beam steering the second polarized beam, a mechanical amplitude SLM for amplitude modulating a combination of (i) the first polarized beam and (ii) the second polarized beam as beam steered by the phase SLM, and a filter for removing, from the combination of the first and second polarized beams, one or more of a plurality of diffraction orders introduced by the mechanical amplitude SLM, to generate filtered, modulated output light.

(A2) The dual-modulation laser projection system denoted as (A1) may further include a polarizing beam combiner for forming, and directing toward the mechanical amplitude SLM, the combination of the first and second polarized beams.

(A3) The dual-modulation laser projection system denoted as (A2) may further include a wave plate, between the polarizing beamsplitter and the polarizing beam combiner, for changing polarization of the first polarized beam, to adjust fraction of the first polarized beam being directed toward the mechanical amplitude SLM by the polarizing beam combiner.

(A4) In the dual-modulation laser projection system denoted as (A1), the mechanical amplitude SLM may be configured to receive the first and second polarized beams from two different respective directions, so as to form the combination of the first and second polarized beams.

(A5) The dual-modulation laser projection system denoted as (A4) may further include a half-wave plate for rotating polarizing of one of the first and second polarized beams, prior to combination thereof on the mechanical amplitude SLM, such that the first and second polarized beams have same polarization when received by the mechanical amplitude SLM.

(A6) In the dual-modulation laser projection system denoted as (A5), the half-wave plate may be positioned in path of the first polarized beam.

(A7) In any of the dual-modulation laser projection systems denoted as (A1) through (A6), the filter may include (a) a lens for spatially Fourier transforming the diffraction orders, and (b) a mask, positioned at Fourier plane of the lens, for transmitting at least one of the diffraction orders while blocking the remaining ones of the diffraction orders.

(A8) The dual-modulation laser projection system denoted as (A7) may further include a collimating lens for collimating the combination of the first and second polarized beams after the mask.

(A9) In any of the dual-modulation laser projection systems denoted as (A1) through (A8), the mechanical amplitude SLM may include an array of mirrors for modulating amplitude of respective spatial components of the combination of the first and second polarized beams.

(A10). The dual-modulation laser projection system of A9, incidence angle of the first and second polarized beams onto the mirrors being no more than 10 degrees relative to normal incidence.

(A11) In any of the dual-modulation laser projection systems denoted as (A1) through (A10), the phase SLM may include an array of liquid crystals for modulating phase of respective spatial components of the second polarized beam to induce said beam steering of the second polarized beam.

(A12) In the dual-modulation laser projection system denoted as (A11), the phase SLM may be implemented in a liquid-crystal-on-silicon device configured to reflect the second polarized beam toward the mechanical amplitude SLM.

(A13) In the dual-modulation laser projection system denoted as (A11), the array of liquid crystals may be implemented in a liquid crystal panel configured to transmit the second polarized beam toward the mechanical amplitude SLM.

(A14) Any of the dual-modulation laser projection systems denoted as (A1) through (A13) may further include an illumination module for outputting the laser light as unpolarized light.

(A15) A polychromatic dual-modulation laser projector may include (a) three instances of any one of the dual-modulation laser projection systems denoted as (A1) through (A14), wherein each of the instances is configured to process laser light of a respective one of three different colors to generate filtered, modulated output light, (b) three collimating lenses each configured to collimate the filtered, modulated output light of a respective one of the three different colors to generate collimated output light, and (c) a beam combiner for combining the collimated output light of the three different colors.

(B1) A dual-modulation laser projection method may include splitting laser light into first and second polarized beams having mutually orthogonal polarizations, phase modulating the second polarized beam in a spatially non-uniform manner to beam steer the second polarized beam, and, after the step of modulating the second polarized beam, (i) combining the first and second polarized beams into combined light, (ii) mechanically amplitude modulating the combined light in a spatially non-uniform manner, and (iii) removing, from the combined light, one or more of a plurality of diffraction orders introduced in the step of mechanically amplitude modulating the combined light, so as to generate filtered modulated output light.

(B2) In the dual-modulation laser projection method denoted as (B1), the step of mechanically amplitude modulating may include adjusting orientation of a plurality of mirrors of a mirror array.

(B3) In either of the dual-modulation laser projection methods denoted as (B1) and (B2), in the step of splitting, each of the mutually orthogonal polarizations may be linear.

(B4) The dual-modulation laser projection method denoted as (B3) may further include prior to the step of combining, rotating polarization of the first polarized beam to adjust power of a first linear polarization component of the first polarized beam, and the step of combining may include combining the second polarized beam with only the first linear polarization component of the first polarized beam.

(B5) The dual-modulation laser projection method denoted as (B3) may further include rotating polarization of one of the first and second polarized beams such that the first and second polarized beams have same polarization during the step of mechanically amplitude modulating.

(B6) In any of the dual-modulation laser projection methods denoted as (B1) through (B5), the step of removing may include spatially Fourier transforming angles of the diffraction orders into positions of the diffraction orders at a Fourier plane, and, at the Fourier plane, (a) transmitting only a portion of the combined light having position at the Fourier plane corresponding to a first subset of the diffraction orders, and (b) blocking a remaining portion of the combined light.

(B7) A polychromatic dual-modulation laser projection method may include (I) for laser light of each of three different colors, (a) performing any one of the dual-modulation laser projection methods denoted as (B1) through (B6) to generate filtered modulated output light having a respective one of the three different colors, and (b) collimating the filtered modulated output light having the respective one of the three different colors, and (II) after the step of collimating for each of the three different colors, combining the filtered modulated output light of the three different colors.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A dual-modulation laser projection system, comprising:
    a polarizing beamsplitter for splitting laser light into first and second polarized beams having mutually orthogonal polarizations;
    a phase spatial light modulator (SLM) for beam steering the second polarized beam;
    a mechanical amplitude SLM for amplitude modulating a combination of (i) the first polarized beam and (ii) the second polarized beam as beam steered by the phase SLM, the mechanical amplitude SLM being configured to receive the first and second polarized beams from two different respective directions, so as to form the combination of the first and second polarized beams; and
    a filter for removing, from an amplitude modulated combination of the first and second polarized beams, one or more of a plurality of diffraction orders introduced by the mechanical amplitude SLM, to generate filtered, modulated output light.

2. The dual-modulation laser projection system of claim 1, further comprising a polarizing beam combiner for forming, and directing toward the mechanical amplitude SLM, the combination of the first and second polarized beams.

3. The dual-modulation laser projection system of claim 2, further comprising a wave plate, between the polarizing beamsplitter and the polarizing beam combiner, for changing polarization of the first polarized beam, to adjust fraction of the first polarized beam being directed toward the mechanical amplitude SLM by the polarizing beam combiner.

4. The dual-modulation laser projection system of claim 1, further comprising a half-wave plate for rotating polarizing of one of the first and second polarized beams, prior to combination thereof on the mechanical amplitude SLM, such that the first and second polarized beams have same polarization when received by the mechanical amplitude SLM.

5. The dual modulation laser projection system of claim 1, wherein the filter is configured to generate the output light as collimated light, or wherein the dual modulation laser projection system further comprises a collimation lens.

6. The dual modulation laser projection system of claim 1, further comprising a controller configured to control an operation of the phase SLM, the mechanical amplitude SLM, and the filter to produce a desired output light specified by an external input to the controller.

7. The dual-modulation laser projection system of claim 1, the filter including:
    a lens for spatially Fourier transforming the diffraction orders; and
    a mask, positioned at Fourier plane of the lens, for transmitting at least one of the diffraction orders while blocking the remaining ones of the diffraction orders.

8. The dual-modulation laser projection system of claim 1, the mechanical amplitude SLM including an array of mirrors for modulating amplitude of respective spatial components of the combination of the first and second polarized beams.

9. The dual-modulation laser projection system of claim 1, the phase SLM including an array of liquid crystals for modulating phase of respective spatial components of the second polarized beam to induce said beam steering of the second polarized beam.

10. The dual-modulation laser projection system of claim 1, further comprising an illumination module for outputting the laser light as unpolarized light.

11. A dual-modulation laser projection method, comprising:
    splitting laser light into first and second polarized beams having mutually orthogonal polarizations, each of the mutually orthogonal polarizations being linear;
    phase modulating the second polarized beam in a spatially non-uniform manner to beam steer the second polarized beam; and
    after the step of modulating the second polarized beam:
        rotating polarization of one of the first and second polarized beams such that the first and second polarized beams have same polarization,
        combining the rotated first and second polarized beams into combined light,
        mechanically amplitude modulating the combined light in a spatially non-uniform manner, and
        removing, from the amplitude modulated combined light, one or more of a plurality of diffraction orders introduced in the step of mechanically amplitude modulating the combined light, so as to generate filtered modulated output light.

12. The dual-modulation laser projection method of claim 11, the step of mechanically amplitude modulating comprising adjusting orientation of a plurality of mirrors of a mirror array.

13. The dual-modulation laser projection method of claim 11,
further comprising, prior to the step of combining, rotating polarization of the first polarized beam to adjust power of a first linear polarization component of the first polarized beam; and
the step of combining comprising combining the second polarized beam with only the first linear polarization component of the first polarized beam.

14. The dual-modulation laser projection method of claim 11, further comprising the step of generating the output light as collimated light.

15. The dual-modulation laser projection method of claim 11, the step of removing comprising:
spatially Fourier transforming angles of the diffraction orders into positions of the diffraction orders at a Fourier plane; and
at the Fourier plane:
transmitting only a portion of the combined light having position at the Fourier plane corresponding to a first subset of the diffraction orders, and
blocking a remaining portion of the combined light.

16. A dual-modulation laser projection system, comprising:
a polarizing beamsplitter for splitting laser light into first and second polarized beams having mutually orthogonal polarizations;
a phase spatial light modulator (SLM) for beam steering the second polarized beam;
a mechanical amplitude SLM for amplitude modulating a combination of (i) the first polarized beam and (ii) the second polarized beam as beam steered by the phase SLM; and
a filter for removing, from an amplitude modulated combination of the first and second polarized beams, one or more of a plurality of diffraction orders introduced by the mechanical amplitude SLM, to generate filtered, modulated output light, wherein the filter is configured to generate the output light as collimated light, or wherein the dual modulation laser projection system further comprises a collimation lens.

17. A dual-modulation laser projection system, comprising:
a polarizing beamsplitter for splitting laser light into first and second polarized beams having mutually orthogonal polarizations;
a phase spatial light modulator (SLM) for beam steering the second polarized beam;
a mechanical amplitude SLM for amplitude modulating a combination of (i) the first polarized beam and (ii) the second polarized beam as beam steered by the phase SLM;
a polarizing beam combiner for forming, and directing toward the mechanical amplitude SLM, the combination of the first and second polarized beams;
a wave plate, between the polarizing beamsplitter and the polarizing beam combiner, for changing polarization of the first polarized beam, to adjust a fraction of the first polarized beam being directed toward the mechanical amplitude SLM by the polarizing beam combiner; and
a filter for removing, from an amplitude modulated combination of the first and second polarized beams, one or more of a plurality of diffraction orders introduced by the mechanical amplitude SLM, to generate filtered, modulated output light.

18. A dual-modulation laser projection method, comprising:
splitting laser light into first and second polarized beams having mutually orthogonal polarizations, each of the mutually orthogonal polarizations being linear;
phase modulating the second polarized beam in a spatially non-uniform manner to beam steer the second polarized beam; and
after the step of modulating the second polarized beam:
rotating polarization of the first polarized beam to adjust power of a first linear polarization component of the first polarized beam,
combining the second polarized beam with only the first linear polarization component of the first polarized beam,
mechanically amplitude modulating the combined light in a spatially non-uniform manner, and
removing, from the amplitude modulated combined light, one or more of a plurality of diffraction orders introduced in the step of mechanically amplitude modulating the combined light, so as to generate filtered modulated output light.

* * * * *